(12) United States Patent
Huang et al.

(10) Patent No.: US 11,684,892 B2
(45) Date of Patent: Jun. 27, 2023

(54) WATER FILTRATION SYSTEM AND METHOD

(71) Applicant: Pentair Residential Filtration, LLC, Glendale, WI (US)

(72) Inventors: Cola Huang, Suzhou (CN); Peter Tan, Suzhou (CN); Bin Ru, Suzhou (CN); Jack Gong, Suzhou (CN); Tedd Schneidewend, Milwaukee, WI (US)

(73) Assignee: PENTAIR RESIDENTIAL FILTRATION, LLC, Glendale, WI (US)

( * ) Notice: Subject to any disclaimer, the term of this patent is extended or adjusted under 35 U.S.C. 154(b) by 475 days.

(21) Appl. No.: 15/829,644

(22) Filed: Dec. 1, 2017

(65) Prior Publication Data

US 2018/0154310 A1 Jun. 7, 2018

Related U.S. Application Data

(60) Provisional application No. 62/428,991, filed on Dec. 1, 2016.

(51) Int. Cl.
*B01D 61/08* (2006.01)
*B01D 61/02* (2006.01)
(Continued)

(52) U.S. Cl.
CPC ........... *B01D 61/08* (2013.01); *B01D 61/025* (2013.01); *B01D 61/04* (2013.01); *B01D 61/12* (2013.01);
(Continued)

(58) Field of Classification Search
CPC combination set(s) only.
See application file for complete search history.

(56) References Cited

U.S. PATENT DOCUMENTS

| 4,342,651 A | 8/1982 | Ahrens |
| 4,528,093 A | 7/1985 | Winer |

(Continued)

FOREIGN PATENT DOCUMENTS

| CN | 101143735 A | 3/2008 |
| CN | 201665601 U | 12/2010 |

(Continued)

OTHER PUBLICATIONS

First Office Action, Chinese Patent Application No. 201711249553.0, dated Jun. 30, 2021, 17 pages.

(Continued)

*Primary Examiner* — Jason M Greene
*Assistant Examiner* — Eric J McCullough
(74) *Attorney, Agent, or Firm* — Husch Blackwell LLP

(57) ABSTRACT

Some embodiments provide a water filtration system that is fluidly coupled to a water feed line and/or a water supply line and is designed to filter contaminates from the water supply. The water filtration system includes an outer housing, a front cover, a rear cover, a pump, a reverse osmosis (RO) element, a pre-filter cartridge, a post-filter cartridge, a permeate flush tank, a RO manifold, and a sensor manifold. The water filtration system further includes a pump and at least one solenoid. When assembled, a RO housing, a pre-filter housing, and a post-filter housing surround the RO element, the pre-filter cartridge, and the post-filter cartridge, respectively. The filter cartridges hold replaceable filtration media in an interior cavity and contaminants and other impurities are removed as water flows through the filtration media of the filter cartridges.

19 Claims, 17 Drawing Sheets

(51) Int. Cl.
  *C02F 1/44* (2023.01)
  *C02F 1/00* (2023.01)
  *B01D 61/12* (2006.01)
  *B01D 61/04* (2006.01)

(52) U.S. Cl.
  CPC .............. *C02F 1/001* (2013.01); *C02F 1/441* (2013.01); *B01D 2311/04* (2013.01); *B01D 2311/06* (2013.01); *B01D 2311/14* (2013.01); *B01D 2311/25* (2013.01); *B01D 2311/2649* (2013.01); *B01D 2313/18* (2013.01); *B01D 2313/243* (2013.01); *B01D 2313/90* (2013.01); *C02F 2201/005* (2013.01); *C02F 2209/02* (2013.01); *C02F 2209/03* (2013.01); *C02F 2209/10* (2013.01)

(56) References Cited

U.S. PATENT DOCUMENTS

| | | | |
|---|---|---|---|
| 4,629,568 A | 12/1986 | Ellis, III | |
| 4,645,601 A | 2/1987 | Regunathan et al. | |
| 4,650,586 A | 3/1987 | Ellis, III | |
| 4,711,723 A | 12/1987 | Bray | |
| 4,713,175 A | 12/1987 | Bray | |
| 4,735,716 A | 4/1988 | Petrucci et al. | |
| 4,773,991 A | 9/1988 | Aid | |
| 4,773,993 A | 9/1988 | Yoda et al. | |
| 4,784,763 A | 11/1988 | Hambleton et al. | |
| 4,784,771 A | 11/1988 | Wathen et al. | |
| 4,808,287 A | 2/1989 | Hark | |
| 4,842,724 A | 6/1989 | Bray et al. | |
| 4,980,066 A | 12/1990 | Slegers | |
| 5,032,268 A | 7/1991 | Hahn | |
| 5,037,547 A | 8/1991 | Burrows | |
| 5,078,864 A | 1/1992 | Whittier | |
| 5,132,015 A | 7/1992 | Down | |
| 5,254,243 A | 10/1993 | Carr et al. | |
| 5,282,972 A | 2/1994 | Hanna et al. | |
| 5,296,148 A | 3/1994 | Colangelo et al. | |
| 5,364,525 A | 11/1994 | Hagqvist et al. | |
| 5,428,347 A | 6/1995 | Barron | |
| 5,482,619 A | 1/1996 | Chow | |
| 5,494,573 A | 2/1996 | Schoenmeyr et al. | |
| 5,520,816 A | 5/1996 | Keupper | |
| 5,607,582 A | 3/1997 | Yamazaki et al. | |
| 5,611,923 A | 3/1997 | Suri et al. | |
| 5,639,374 A | 6/1997 | Monroe et al. | |
| 5,647,973 A | 7/1997 | Desaulniers | |
| 5,686,893 A | 11/1997 | Jeon | |
| 5,753,107 A | 5/1998 | Magnusson et al. | |
| 5,817,231 A | 10/1998 | Souza | |
| 5,876,600 A * | 3/1999 | Matsubara | B01D 35/153 210/443 |
| 5,879,558 A | 3/1999 | Monroe et al. | |
| 5,928,503 A | 7/1999 | Shang | |
| 6,001,244 A | 12/1999 | Salter et al. | |
| 6,074,551 A | 6/2000 | Jones et al. | |
| 6,099,733 A | 8/2000 | Haney | |
| 6,103,125 A | 8/2000 | Kuepper | |
| 6,110,375 A | 8/2000 | Bacchus et al. | |
| 6,113,797 A | 9/2000 | Al Samadi | |
| 6,120,688 A | 9/2000 | Daly et al. | |
| 6,190,558 B1 * | 2/2001 | Robbins | B01D 61/025 210/134 |
| 6,217,770 B1 | 4/2001 | Haney et al. | |
| 6,299,766 B1 | 10/2001 | Permar | |
| 7,101,480 B2 | 9/2006 | Carlotto | |
| 7,186,344 B2 | 3/2007 | Hughes | |
| 7,253,741 B2 | 8/2007 | Fiorletta et al. | |
| 7,267,769 B2 | 9/2007 | Baird | |
| 7,316,774 B2 | 1/2008 | Halemba et al. | |
| 7,402,240 B2 | 7/2008 | Kung et al. | |
| 7,407,148 B2 | 8/2008 | Bassett et al. | |
| 7,459,078 B2 | 12/2008 | Klein et al. | |
| 7,513,996 B2 | 4/2009 | Kloos et al. | |
| 7,540,956 B1 | 6/2009 | Kurth et al. | |
| 7,695,614 B2 | 4/2010 | Efraty | |
| 7,736,503 B2 | 6/2010 | Kennedy et al. | |
| 7,736,504 B2 | 6/2010 | Fritze et al. | |
| 7,767,077 B2 | 8/2010 | Yoneda et al. | |
| 7,828,970 B2 | 11/2010 | Kloos et al. | |
| 7,828,971 B2 | 11/2010 | Kloos et al. | |
| 7,837,866 B2 | 11/2010 | Burrows | |
| 7,837,876 B2 | 11/2010 | Ye et al. | |
| 7,862,710 B2 | 1/2011 | Kloos et al. | |
| 7,909,998 B2 | 3/2011 | Kennedy et al. | |
| 7,955,502 B2 | 6/2011 | Greco et al. | |
| 8,052,865 B2 | 11/2011 | Kloos et al. | |
| 8,147,692 B2 | 4/2012 | Oklejas, Jr. | |
| 8,177,973 B2 | 5/2012 | Kennedy et al. | |
| 8,206,581 B2 | 6/2012 | Richetti | |
| 8,262,910 B2 | 9/2012 | Kloos et al. | |
| 8,298,420 B2 | 10/2012 | Burrows | |
| 8,323,484 B2 | 12/2012 | Kung et al. | |
| 8,398,852 B2 | 3/2013 | Burrows | |
| 8,518,252 B1 | 8/2013 | Li | |
| 8,691,095 B2 | 4/2014 | Hooley et al. | |
| 8,741,148 B2 | 6/2014 | Park et al. | |
| 8,746,003 B2 | 6/2014 | Yoon | |
| 8,784,662 B2 | 7/2014 | Becker et al. | |
| 8,808,538 B2 | 8/2014 | Oklejas, Jr. | |
| 8,883,006 B2 | 11/2014 | Kovach et al. | |
| 8,950,052 B2 | 2/2015 | Kruckenberg et al. | |
| 9,067,154 B1 * | 6/2015 | Branscomb | B01D 35/306 |
| 9,314,743 B2 | 4/2016 | Kloos et al. | |
| 9,371,245 B2 | 6/2016 | Burrows | |
| 9,375,683 B2 | 6/2016 | Becker et al. | |
| 9,393,508 B2 | 7/2016 | Sann et al. | |
| 2004/0168978 A1 * | 9/2004 | Gray | B01D 61/08 210/636 |
| 2005/0035042 A1 | 2/2005 | Rowe et al. | |
| 2005/0103697 A1 | 5/2005 | Magnusson et al. | |
| 2005/0103717 A1 | 5/2005 | Jha et al. | |
| 2006/0006104 A1 * | 1/2006 | Cary | C02F 1/325 210/167.01 |
| 2006/0043008 A1 * | 3/2006 | Joulakian | B01D 61/08 210/110 |
| 2006/0070942 A1 * | 4/2006 | An | C02F 9/005 210/433.1 |
| 2006/0138031 A1 * | 6/2006 | Kloos | B01D 61/022 210/96.2 |
| 2006/0201857 A1 | 9/2006 | Lin | |
| 2007/0284296 A1 | 12/2007 | Swain et al. | |
| 2009/0200217 A1 | 8/2009 | Kim | |
| 2012/0048794 A1 * | 3/2012 | Kovach | C02F 1/441 210/321.6 |
| 2013/0068684 A1 | 3/2013 | Kruckenberg et al. | |
| 2013/0126430 A1 | 5/2013 | Kenley et al. | |
| 2015/0166369 A1 | 6/2015 | Burrows | |
| 2016/0201625 A1 | 7/2016 | Jokschas et al. | |

FOREIGN PATENT DOCUMENTS

| | | |
|---|---|---|
| CN | 101977670 A | 2/2011 |
| CN | 102115230 A | 7/2011 |
| CN | 102179173 A | 9/2011 |
| CN | 102115229 B | 7/2012 |
| CN | 102531075 A | 7/2012 |
| CN | 102115230 B | 8/2012 |
| CN | 202369449 U | 8/2012 |
| CN | 202538491 U | 11/2012 |
| CN | 202880932 U | 4/2013 |
| CN | 103241804 A | 8/2013 |
| CN | 203159358 U | 8/2013 |
| CN | 203389421 U | 1/2014 |
| CN | 103645706 A | 3/2014 |
| CN | 102179173 B | 4/2014 |
| CN | 103755056 A | 4/2014 |
| CN | 203683258 U | 7/2014 |
| CN | 203741139 U | 7/2014 |
| CN | 104155885 A | 11/2014 |
| CN | 203946970 U | 11/2014 |

(56) References Cited

FOREIGN PATENT DOCUMENTS

| | | |
|---|---|---|
| CN | 104193020 A | 12/2014 |
| CN | 203999175 U | 12/2014 |
| CN | 204022516 U | 12/2014 |
| CN | 204039078 U | 12/2014 |
| CN | 204039166 U | 12/2014 |
| CN | 204044543 U | 12/2014 |
| CN | 204097112 U | 1/2015 |
| CN | 204111379 U | 1/2015 |
| CN | 204129456 U | 1/2015 |
| CN | 204134353 U | 2/2015 |
| CN | 204214625 U | 3/2015 |
| CN | 204246928 U | 4/2015 |
| CN | 204281381 U | 4/2015 |
| CN | 204310856 U | 5/2015 |
| CN | 204310857 U | 5/2015 |
| CN | 204310858 U | 5/2015 |
| CN | 104671481 A | 6/2015 |
| CN | 204384930 U | 6/2015 |
| CN | 204656344 U | 9/2015 |
| CN | 105481131 A | 4/2016 |
| ES | 2532034 B1 * | 2/2016 |
| JP | 2007136413 A | 6/2007 |
| JP | 2012096172 A | 5/2012 |
| KR | 20120101810 A | 9/2012 |
| KR | 101193629 B1 | 10/2012 |
| WO | WO-0185314 A1 * | 11/2001 ............. C02F 9/005 |
| WO | 03076044 A1 | 9/2003 |

OTHER PUBLICATIONS

Office Action issued for Chinese Application No. 201711249553.0 dated Mar. 1, 2022, 19 pages.

Office Action issued by the China National Intellectual Property Administration for Chinese Application No. 201711249553.0 dated May 31, 2022 with English Translation.

\* cited by examiner

WATER FILTRATION SYSTEM AND METHOD

RELATED APPLICATIONS

This application claims priority to U.S. Provisional Application No. 62/428,991 filed on Dec. 1, 2016, the entire contents of which are incorporated herein by reference.

BACKGROUND

Water filtration systems are frequently used in a variety of settings including residential and commercial applications in which the systems are designed to remove contaminants and other impurities from the water supply to provide filtered water to an end user. To that end, water quality varies drastically globally, which requires unique filtration parameters tailored to the specific properties of the water being filtered and the level and quality of filtration desired by the end user.

Water filtration systems typically include a filter cartridge coupled to a manifold, and are usually installed at any number of locations along the water supply line. For example, a water filtration system may be installed in a refrigerator in communication with a built-in water dispenser. Additionally, a water filtration system may be installed under a countertop that supports a sink and/or a faucet. Alternatively, or in addition, a water filtration system may be employed on the faucet itself. Finally, other types of water filtration systems may be utilized at some other point in the water supply between the main water line that supplies water from a municipal or city water source to the end dispensing point (e.g., a faucet, water dispenser, etc.).

In many instances, water filtration systems utilize a changeable and disposable filter cartridge when the filter cartridge has reached the end of its operable life. However, such cartridges are typically difficult to disengage, and changing out such cartridges regularly results in leakage of water. Thus, there is a need for a quick change mechanism that includes tactile, audible, and/or visual feedback to the user that the cartridge is fully installed and that substantially prevents leaks from either the filter cartridge or the system before and after installation. Still further, a need exists for an electronic leak detection sensor that is operable to signal to a user that a leak exists in the water filtration system.

Still further, after shut down of many currently available water filtration systems, salt can build up along one or more locations within such systems. Salt build up can cause contamination of the clean water that the filter system is designed to produce. More specifically, when a reverse osmosis (RO) element is provided within the water filtration system, such an element typically requires high cross flow velocities to reduce the level of particulate build up in the feed stream and to fight concentration polarization. For a conventional RO system to become more efficient, it has to restrict the drain. However, the cross flow velocities may eventually become too low to be effective. There is therefore a need for a system that is designed to re-circulate some permeate water back throughout the system.

As such, there is a need to provide a system that addresses one or more of the above noted problems that may be associated with current residential water filtration systems.

SUMMARY

A water filtration system is disclosed that is fluidly coupled with a water feed line and/or a water supply line not shown) and is designed to filter contaminates from the water supply. The water filtration system includes an outer housing, a front cover, a rear cover, a pump, a reverse osmosis (RO) element, a pre-filter cartridge, a post-filter cartridge, a permeate flush tank, a RO manifold, and a sensor manifold. The water filtration system further includes at least one solenoid. When assembled, a RO housing, a pre-filter housing, and a post-filter housing surround the RO element, the pre-filter cartridge, and the post-filter cartridge, respectively. One or more of the filter cartridges may hold replaceable filtration media in their respective interior cavities. Contaminants and other impurities are removed as water flows through the filtration media of the filter cartridges. The water filtration system may also include a magnetic cover attachment, one or more leak detection sensors, a permeate flush portion, and a concentrate recirculation portion.

These and other aspects will become apparent in light of the following detailed description.

DETAILED DESCRIPTION

Figure 1:
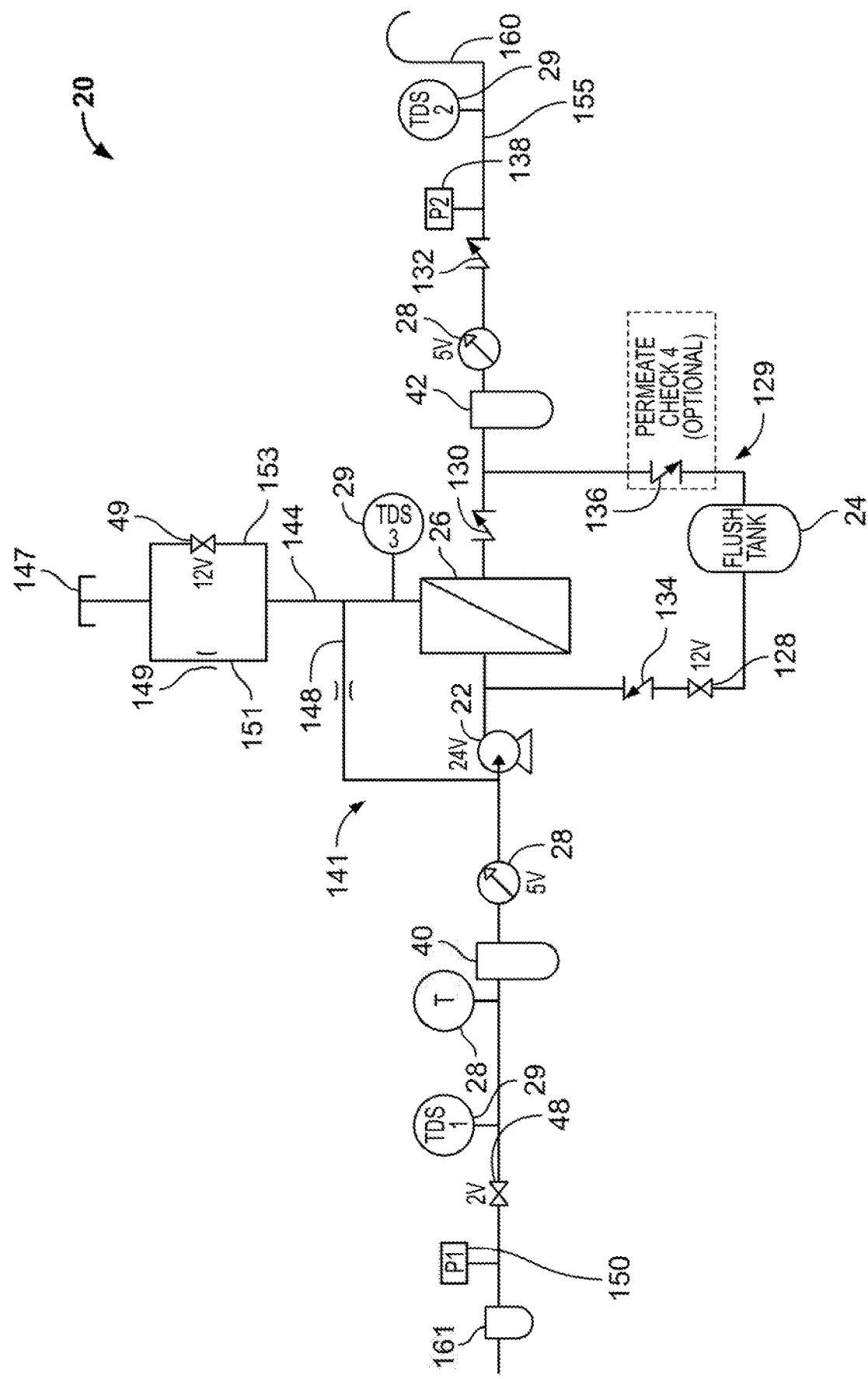
FIG. 1 is a schematic illustration of a water filtration system.

Before any embodiments are explained in detail, it is to be understood that the embodiments disclosed herein are not limited in application to the details of construction and the arrangement of components set forth in the following description or illustrated in the following drawings. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. The term "upstream" refers to a location closer to the inlet of the water, while the term "downstream" refers to a location closer to the outlet of the water.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize that the examples provided herein have many useful alternatives and fail within the scope of embodiments of the invention.

A Reverse Osmosis (RO) water filtration system 20 is generally illustrated in FIGS. 2-4 and 22 and includes numerous features that make the system unique to the residential market (e.g., designed to be used by homeowners at their place of residence). For example, the water filtration system 20 does not use a large water storage tank, and instead uses one or more larger membranes in order to provide on demand filtered water to the end user. The system 20 is designed to be tankless and uses a pump 22 and various flow channels to increase cross flow velocity across one or more membranes, which allows for higher water recoveries. To reduce Total Dissolved Solids (TDS) creep (e.g., salt passage or salt diffusion), a permeate water flush tank 24 may be in fluid communication with an RO element or cartridge 26, the flush tank 24 being used to store permeate that can be used to flush salts or other impurities in the permeate line. In some embodiments, water that is stored in the flush tank 24 can be used to flush the concentrate side of the RO cartridge 26 to reduce the salt levels in the feed stream, which in turn reduces the salt passage across the RO cartridge 26. As shown in FIG. 1, the flush tank 24 may be provided in parallel with respect to the RO cartridge 26 such that the flush tank 24 and the RO cartridge 26 form a loop.

The filtration system 20 may be used in numerous settings and may be secured to a variety of surfaces. For example, the filtration system 20 may be secured to a vertical wall under a sink adjacent the water feed line. In another instance, the system 20 may be secured to a horizontal floor or a wall under a sink adjacent a water feed line. In some instances, the system 20 is in fluid communication with the water feed line and may not be secured to any other surfaces.

Figure 2:
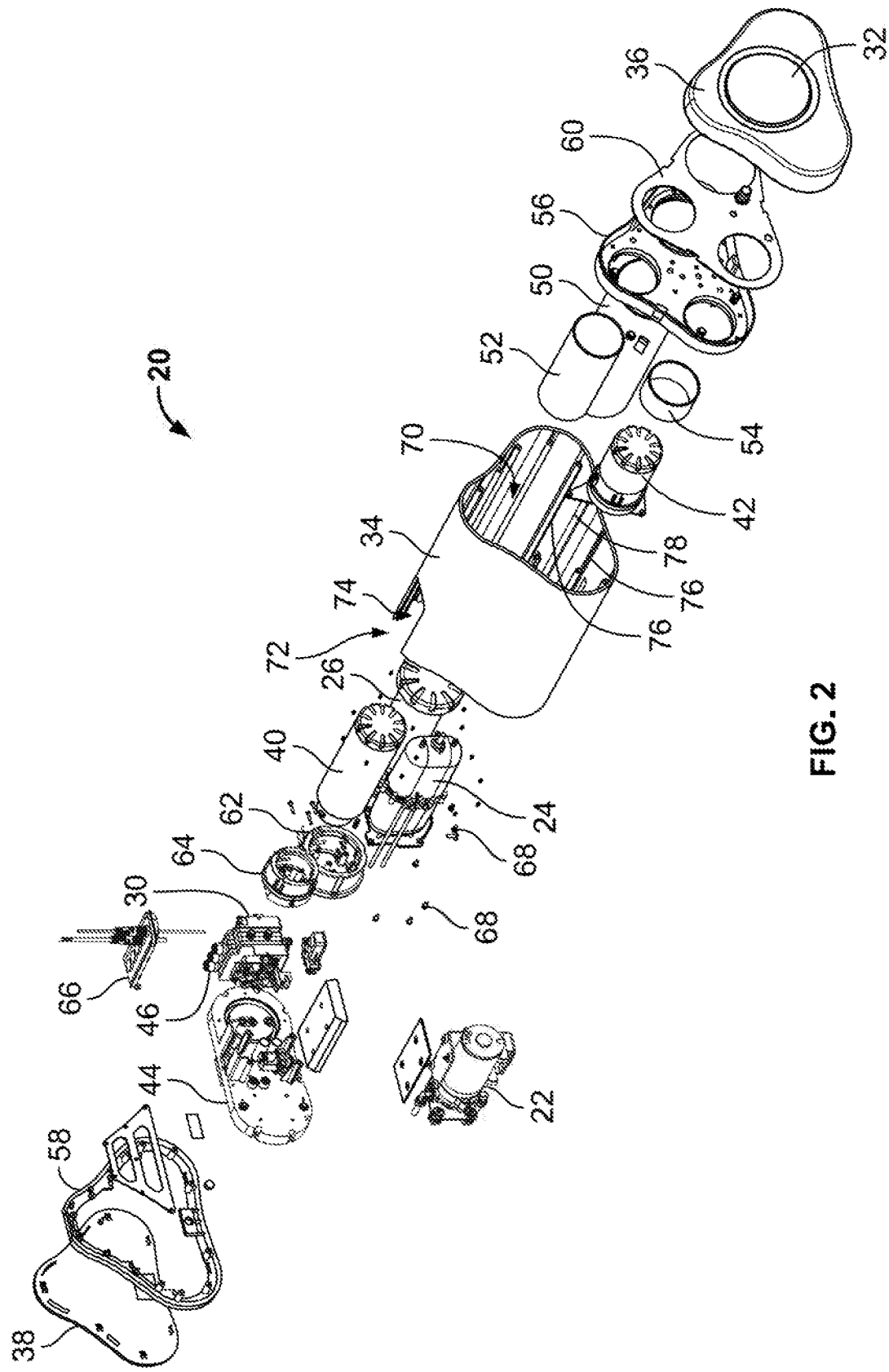
FIG. 2 is an exploded isometric view of a water filtration system embodying aspects of the schematic of FIG. 1.

Referring to FIGS. 1 and 2, the system 20 is designed to use one or more sensors 28, which may include a variety of conductivity, pressure, flow, and temperature sensors. The one or more sensors 28 may be provided alone the inlet of the system 20 to measure any one of the foregoing characteristics of the water prior to treatment, or may be provided along either the drain line or the permeate water line to measure one or more of the foregoing characteristics of the waste water or the permeate water, respectively. The system 20 may also include one or more Total Dissolved Solids meters 29 (TDS meter), which may be used to measure the TDS levels in the water. The one or more sensors 28 and the one or more TDS meters 29 are in communication with a controller 30, which may include a memory and a processor, and is further coupled to one or more pumps, solenoids, other valves, and/or other components within the system 20. The controller 30 allows for operation of the system 20 without causing damage to the various components housed within. The one or more sensors 28, the one or more TDS meters 29, and/or the controller 30 are coupled with a graphical user inter lice 32, which may be a digital screen (see FIGS. 3 and 4), a touchscreen, or the like that outputs operational parameters to a user or technician of the system 20. In some forms, the output information could be shared remotely.

FIGS. 1-4 illustrate the water filtration system 20 that is fluidly coupled with a water feed line (not shown) and/or a water supply line (not shown) and is designed to filter contaminates from the water supply. Referring to the exploded view of FIG. 2, the water filtration system 20 includes one or more of the pump 22, the permeate flush tank 24, the RO cartridge 26, an outer housing 34, a front cover 36, a rear cover 38, a pre-filter cartridge or element 40, a post-filter cartridge or element 42, a RO manifold 44, and a sensor manifold 46. The RO manifold 44 and the sensor manifold 46 are shown more clearly in FIG. 5. Referring again to FIGS. 1 and 2, the water filtration system 20 further includes a first solenoid valve 48 and a second solenoid valve 49. When assembled, a RO housing 50, a pre-filter housing 52, and a post-filter housing 54 surround the RO cartridge 26, the pre-filter cartridge 40, and the post-filter cartridge 42, respectively. The filter cartridges 26, 40, 42 hold replaceable filtration media in an interior cavity and contaminants and other impurities are removed as water flows through the filtration media of the filter cartridges 26, 40, 42.

FIG. 2 depicts a front bracket 56 that is provided adjacent the front cover 36, and a rear bracket 58 that is provided adjacent the rear cover 38. The system 20 also includes a from support 60 disposed between the front bracket 56 and the front cover 36. A RO cap 62 and a pre-filter cap 64 are disposed adjacent the RO cartridge 26 and the pre-filter cartridge 40, respectively. An electronics port 66 is included, which is configured to receive one or more inputs in the form of electrical cords, or some other input. The electronics port 66 may be coupled with the controller 30, a memory, a processor, or any combination thereof. A plurality of securement mechanisms 68 are also shown in the exploded view of FIG. 2. The securement mechanisms 68 are designed to retain the various components within the system 20 and are provided in the form of fasteners, screws, bolts, rivets, nails, or any other securement mechanism known to those of ordinary skill in the art.

Figure 3:
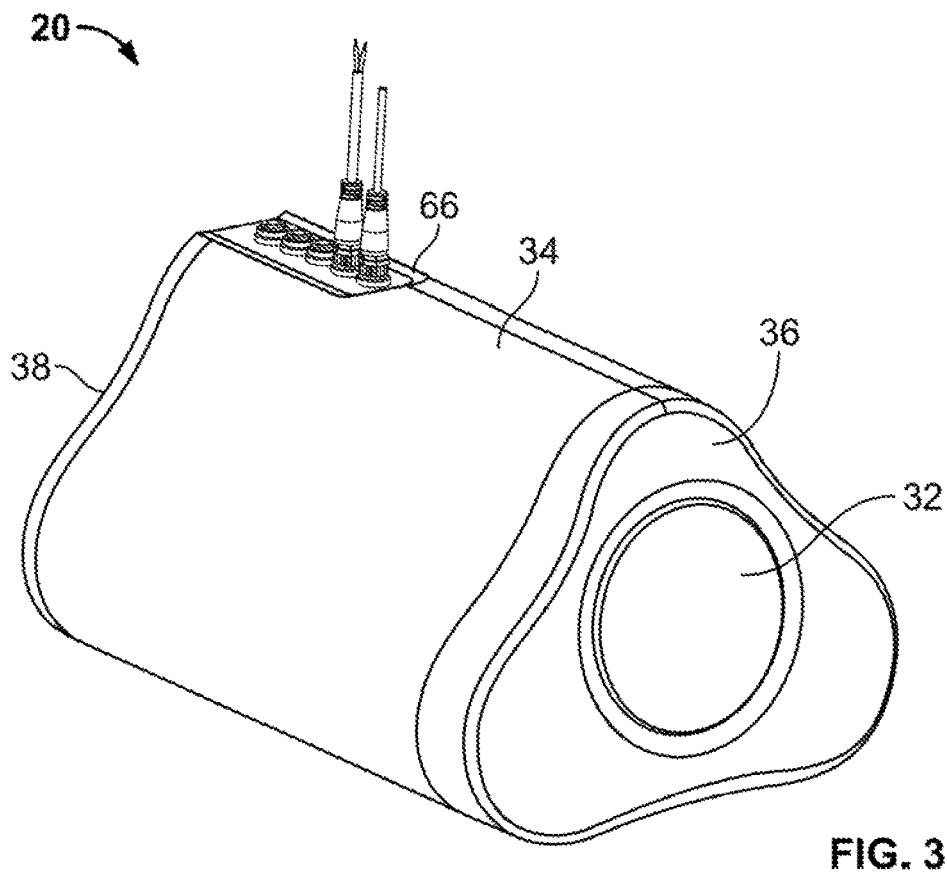
FIG. 3 is an isometric view of the water filtration system of FIG. 2.
Figure 4:
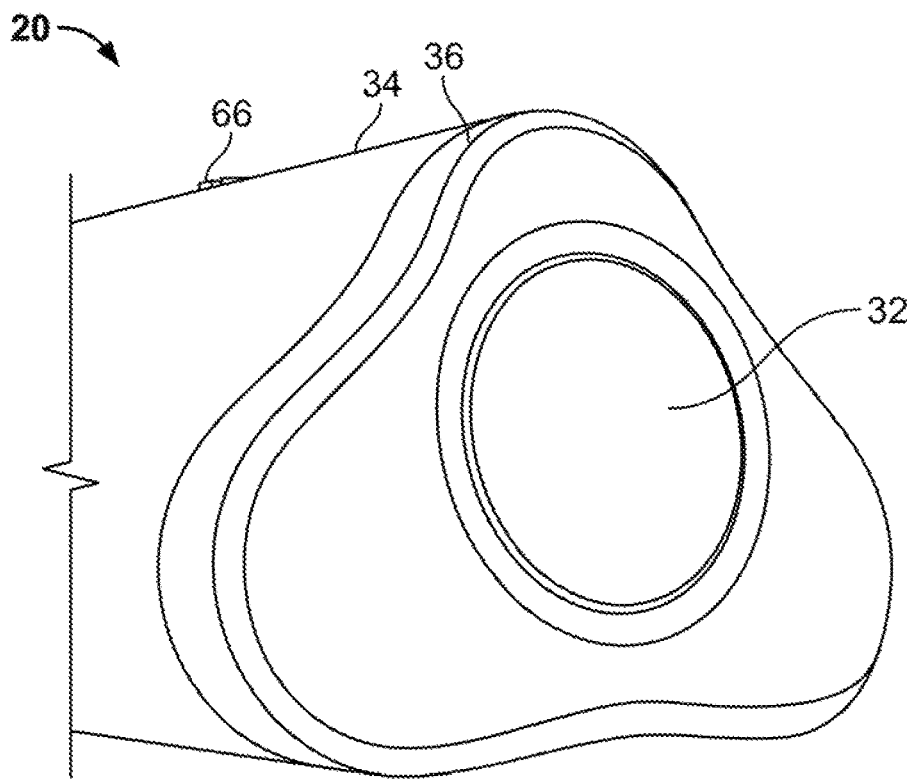
FIG. 4 is a partial isometric view of a front cover of the water filtration system of FIG. 2.
Figure 5:
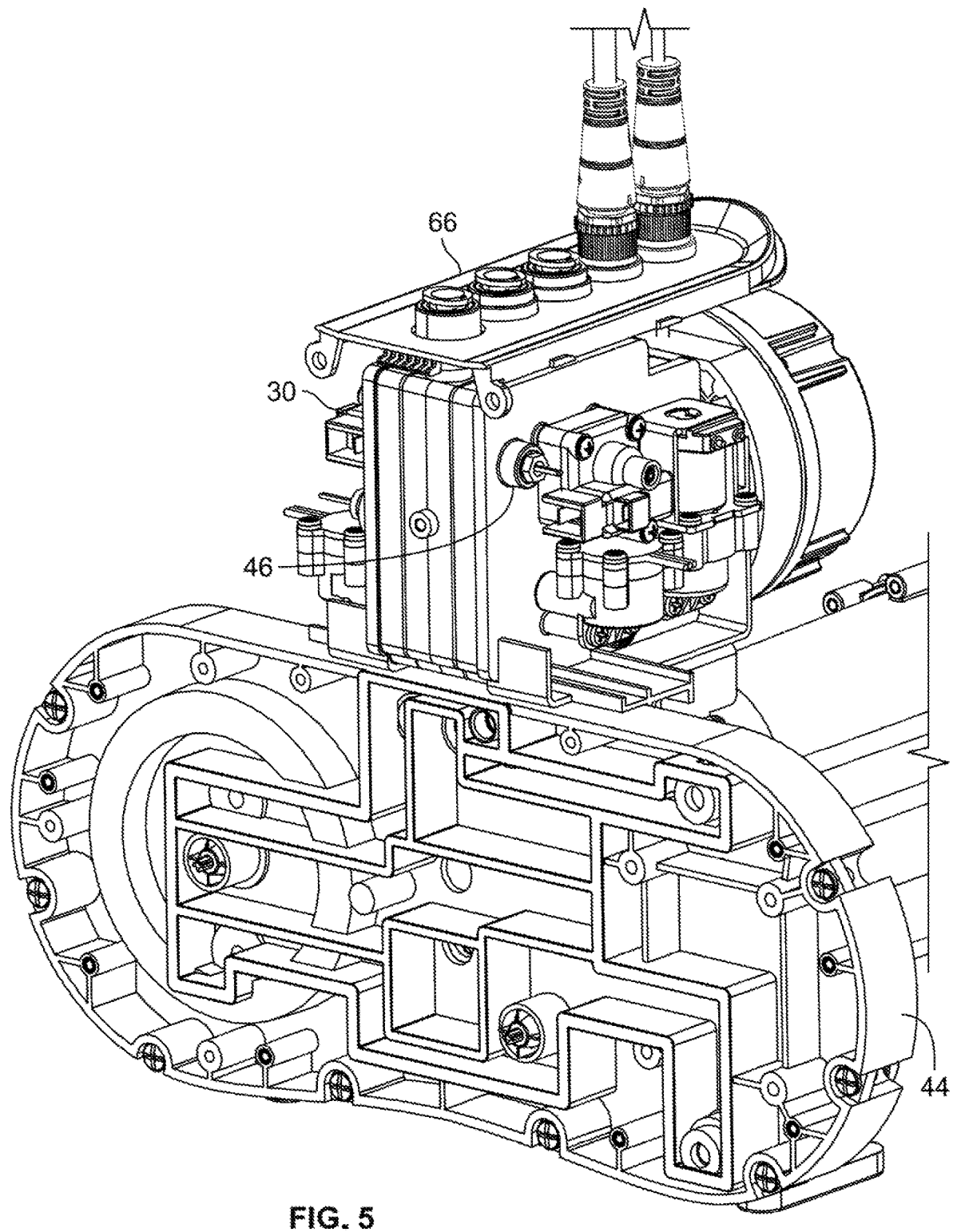
FIG. 5 is an isometric view of some components of the water filtration system of FIG. 2.
Figure 6:
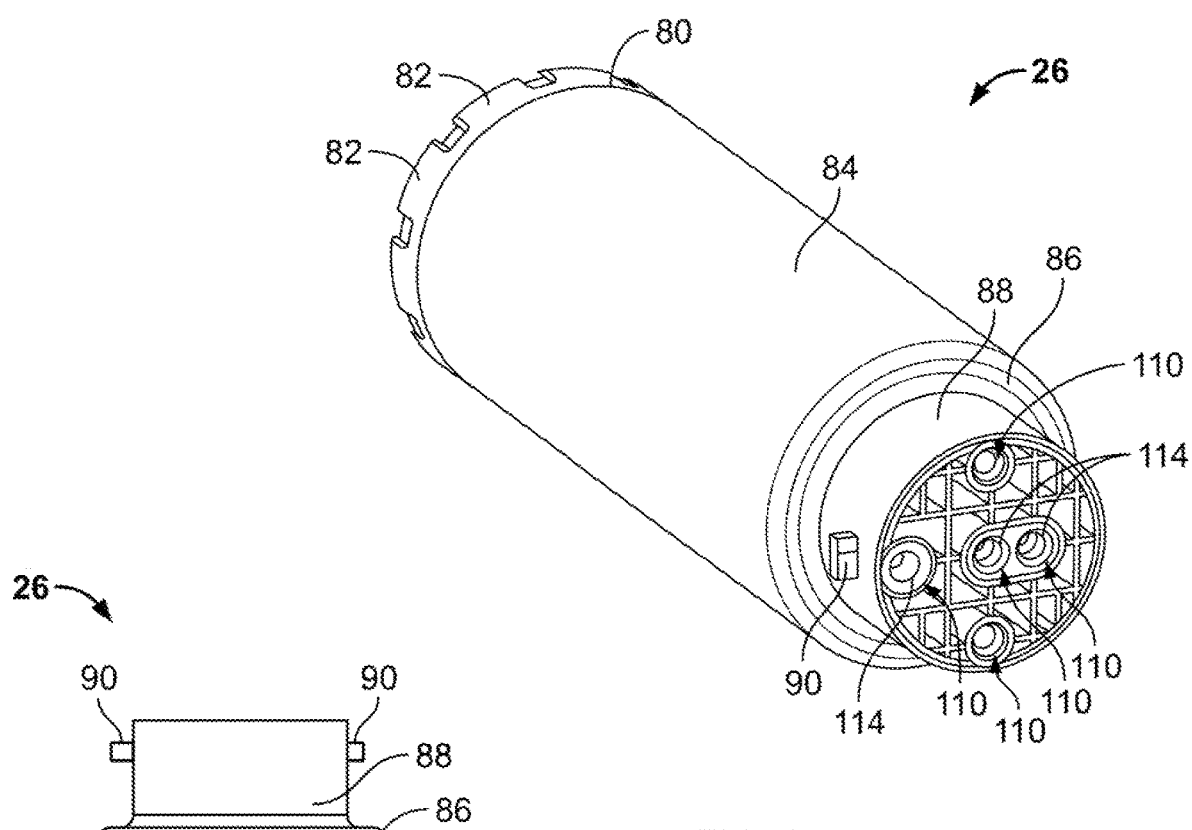
FIG. 6 is an isometric view of a reverse osmosis (RO) element that may be included in the water filtration system of FIG. 2.
Figure 7:
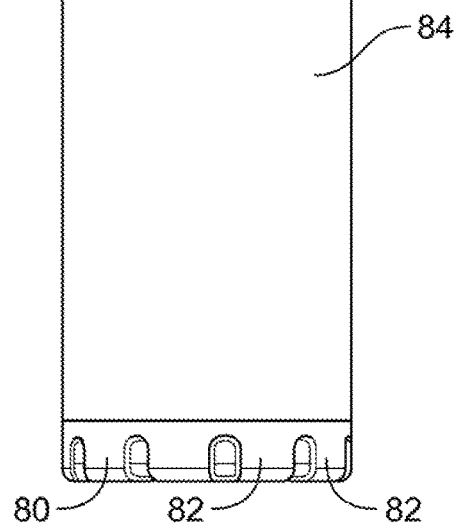
FIG. 7 is a side elevational view of the RO element of FIG. 6.
Figure 8:
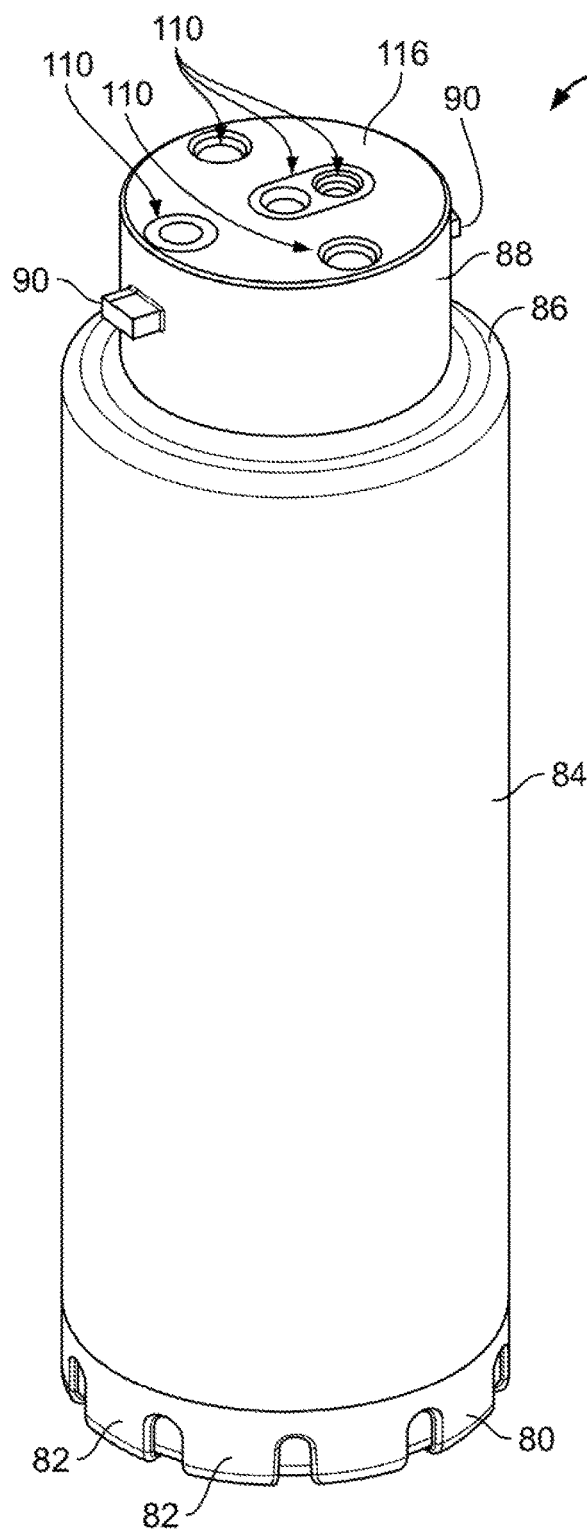
FIG. 8 is a top isometric view of the RO element of FIG. 6.
Figure 9:
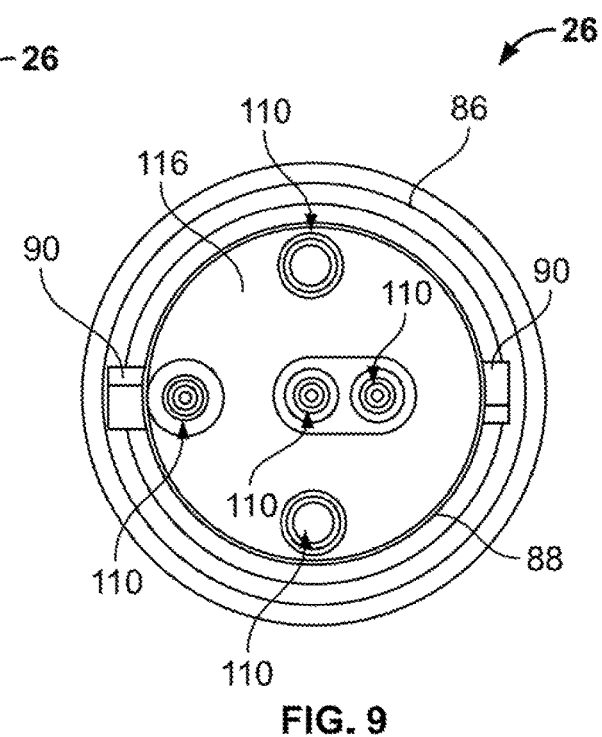
FIG. 9 is a top plan view of the RO element of FIG. 6.
Figure 10:
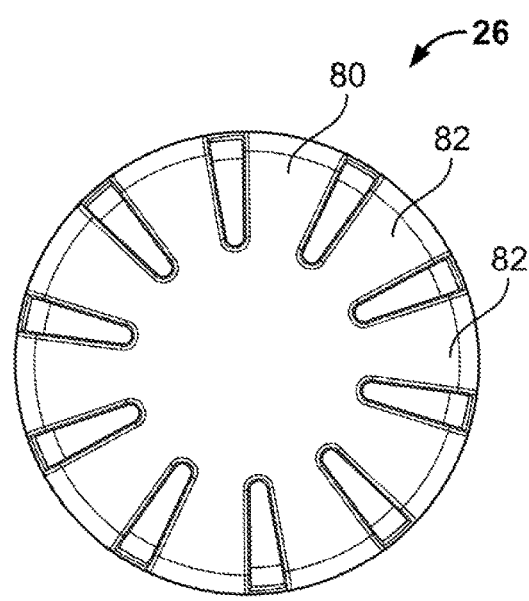
FIG. 10 is a bottom plan view of the RO element of FIG. 6.
Figure 11:
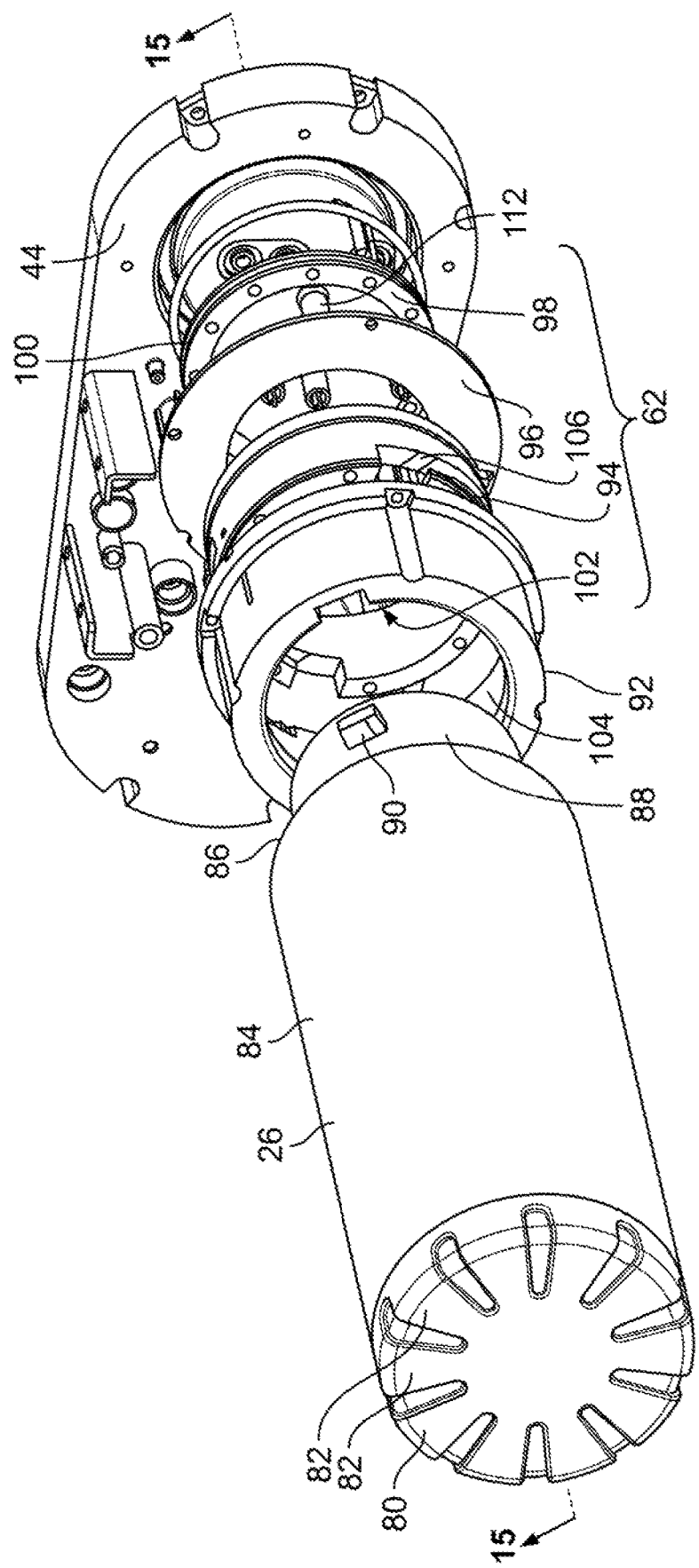
FIG. 11 is an exploded view of the RO element of FIG. 6, a RO manifold, and a plurality of connecting elements.

Referring to FIGS. 2-4, the outer housing 34 is provided in the form of a substantially triangular and elongate body that includes a front opening 70 and a rear opening 72. The rear opening 72 also includes a cutout in the form of an electronics opening 74 that is configured to receive the electronics port 66 when fully assembled. The outer housing 34 includes one or more tracks 76 disposed along an interior side 78 that are operable to engage with one or more of the system components and to hold the components in place during and before use of the water filtration system 20. The one or more tracks 76 may be parallel with respect to one another along a length of the outer housing 34. The one or more tracks 76 may provide a lock and key feature with one or more of the components disposed within the housing to hold the one or more components in place when the system 20 is fully assembled.

Another aspect of the present disclosure, the quick change aspect will now be described. Referring to FIGS. 6-16, the RO cartridge 26 is shown more clearly. The RO cartridge 26 includes a base 80 with a plurality of feet 82, a body 84, a shoulder 86, and a neck 88. Disposed along the neck 88 are a plurality of engagement protrusions 90. The engagement protrusions 90 are configured to engage with the RO cap 62, which is shown in an exploded form in FIG. 11. The RO cap 62 includes a revolving ring 92, a revolving head 94, a gasket 96, and an end plate 98. An O-ring 100 is also shown disposed between the end plate 98 and the RO manifold 44. As will be described in greater detail below, the engagement protrusions 90 of the RO cartridge 26 are slid through engagement slots 102 along an inner surface 104 of the revolving ring 92 of the RO cap 62 into cammed slots 106 provided along an outer wall of the revolving head 94. When assembled, the revolving ring 92 and the gasket 96 are fixedly attached to the RO manifold 44 with one or more securement mechanisms.

Figure 12:
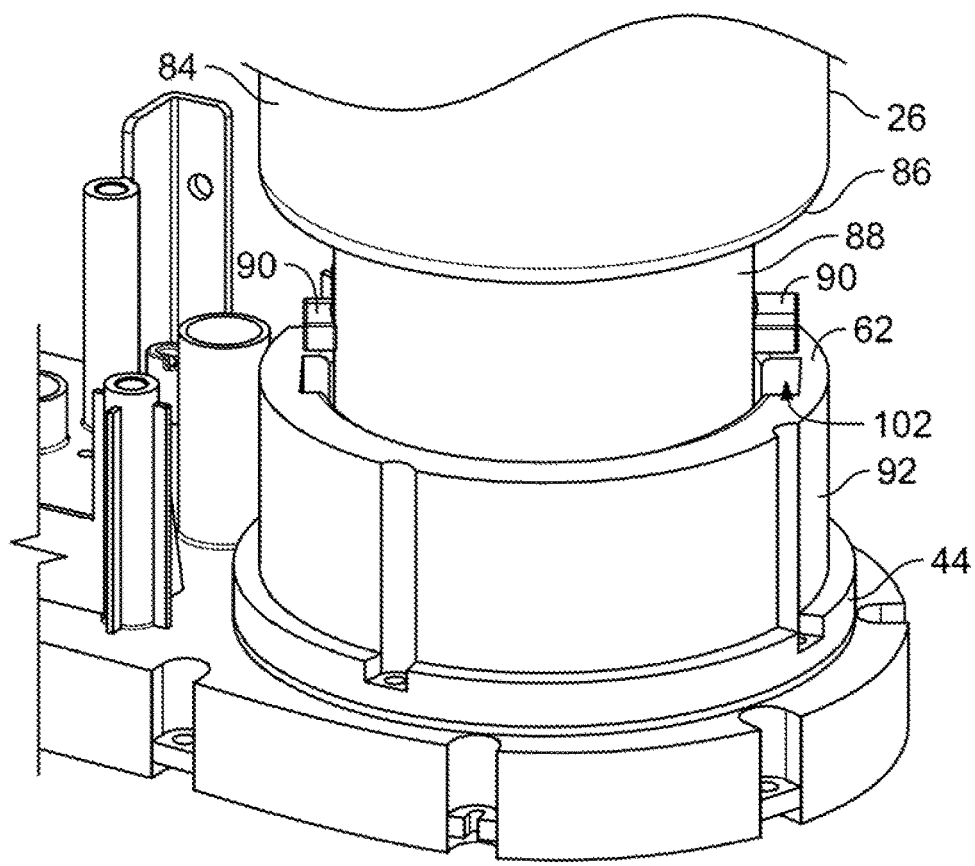
FIG. 12 is a partial isometric view of the RO element, the RO manifold, and the plurality of connecting elements of FIG. 11 in a pre-engaged state.

Referring now to FIG. 12, the RO cartridge 26 is shown prior to insertion into the assembled RO cap 62. As shown in FIG. 12, the engagement protrusions 90 are aligned with the engagement slots 102 and are preferably oriented such that the protrusions 90 will only fit in one orientation when engaged with the RO cap 62. During installation, the protrusions 90 on the RO cartridge 26 are inserted through the slots 102 on the RO cap 62. During this step, a plurality of bores 110 (see FIGS. 6 and 8) on the RO cartridge 26 begin to engage with one or more posts 112 on the end plate 98. The pre-filter cartridge 40 and the post-filter cartridge 42 also include a plurality of bores 110 that may interface with a plurality of posts on other end plates.

Figure 13:
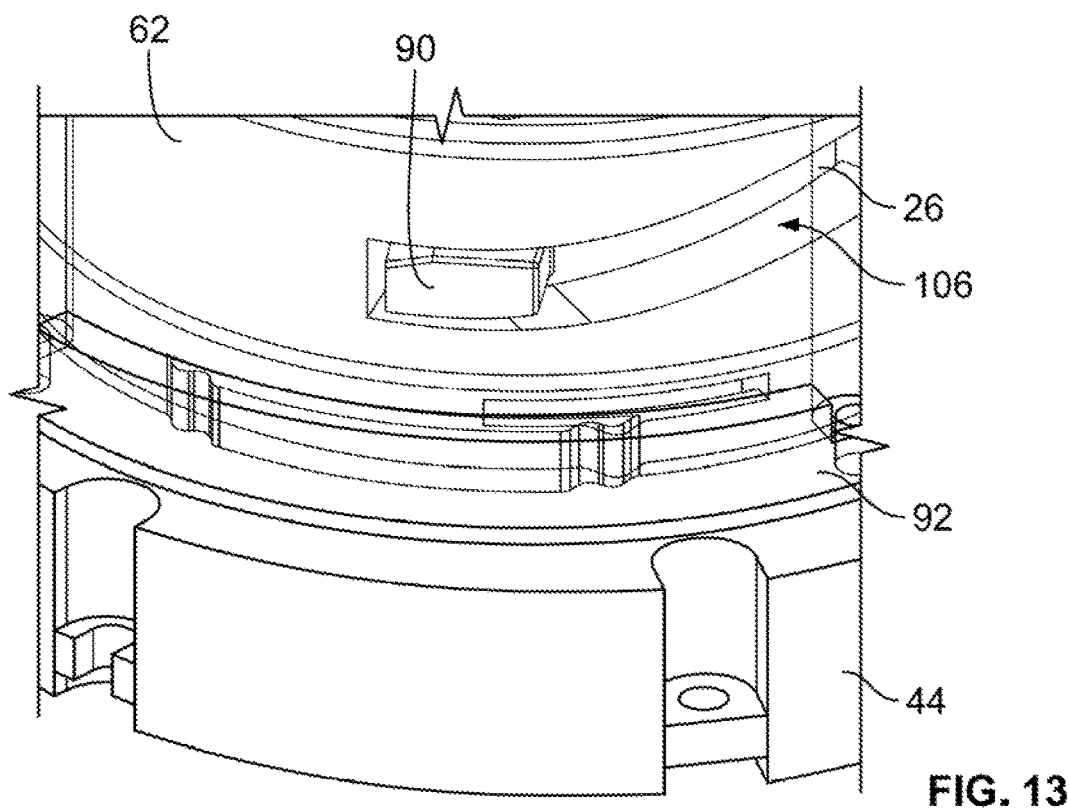
FIG. 13 a partial isometric view of the RO element, the RO manifold, and the plurality of connecting elements of FIG. 11 in an engaged state.
Figure 14:
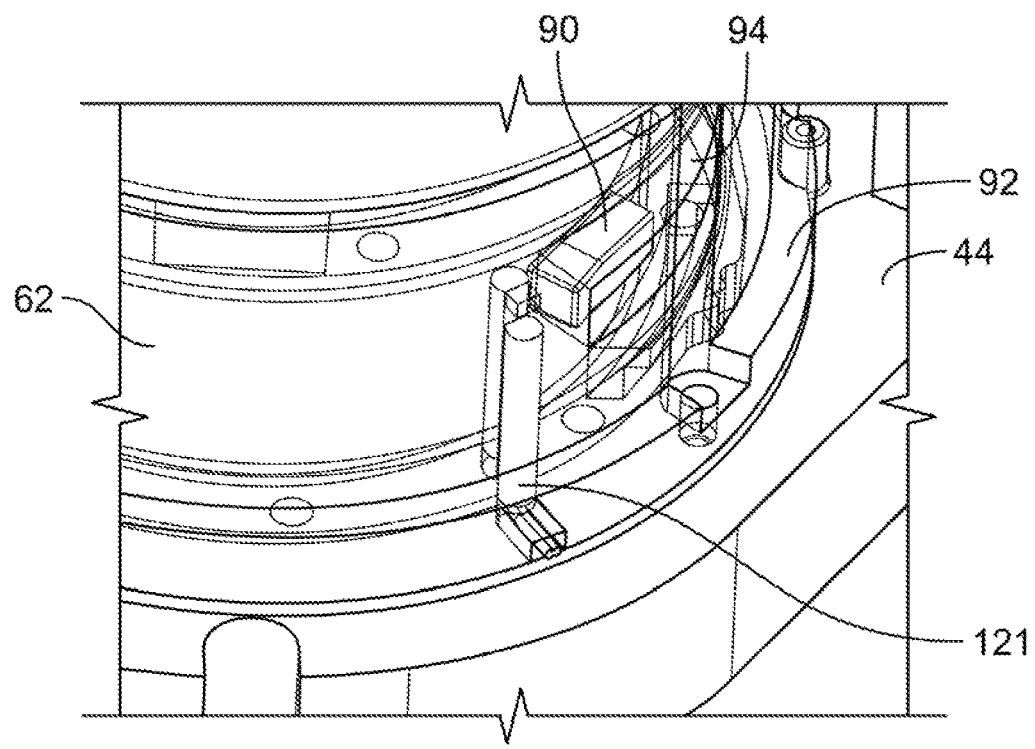
FIG. 14 is a partial isometric view of a sensor disposed adjacent the connecting elements of FIG. 11.
Figure 15:
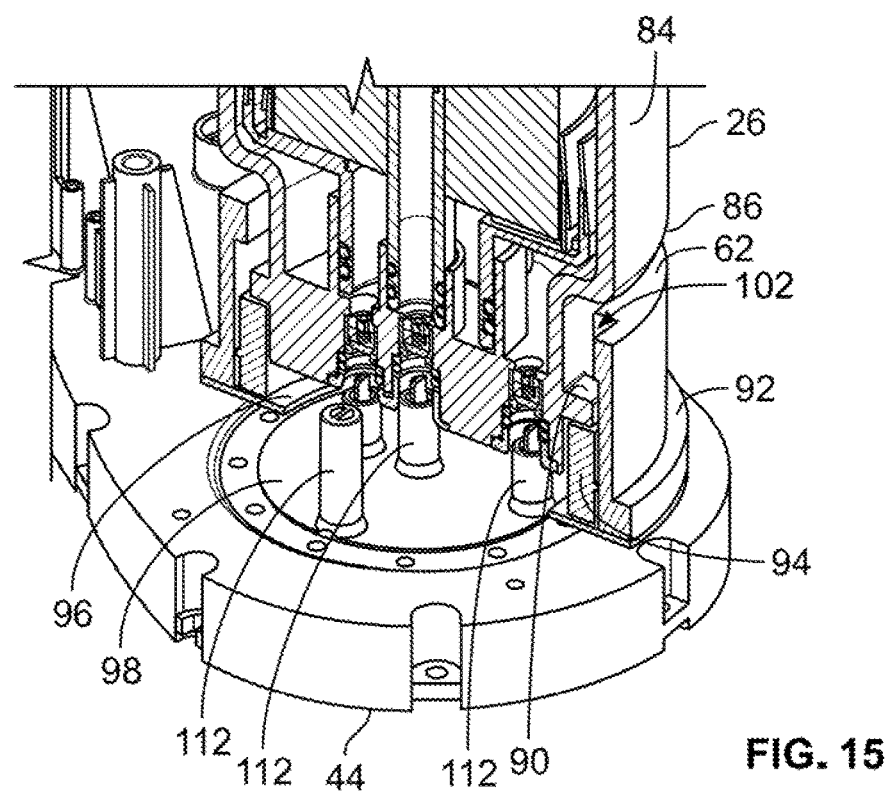
FIG. 15 is a partial cross-sectional view of the RO element and the plurality of connecting elements taken along line 15-15 of FIG. 11.
Figure 16:
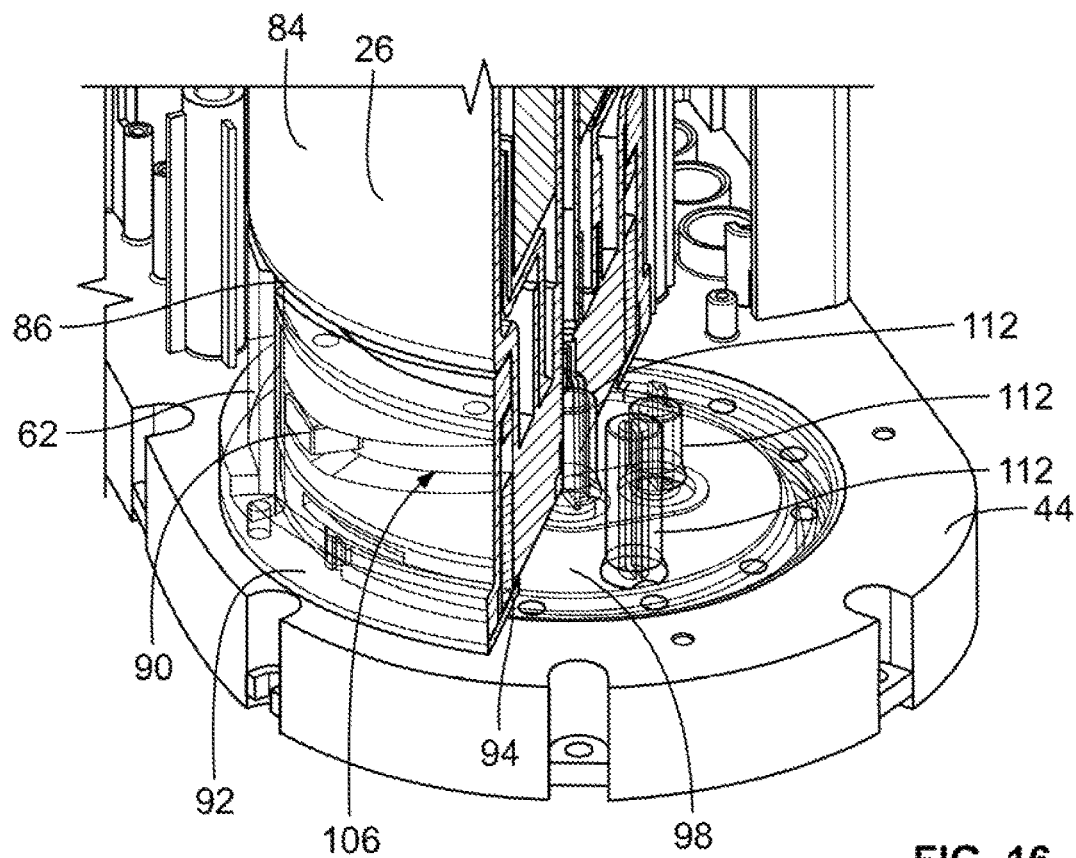
FIG. 16 is another partial cross-sectional view of the RO element and the plurality of connecting elements of FIG. 15.

Referring to FIGS. 13 and 14, once the RO cartridge 26 has been inserted into the RO cap 62, when a user initiates a counterclockwise rotation of the RO cartridge 26, it will begin to move axially towards the RO manifold 44, and will start to engage with check valves 114 (see FIG. 6) along a distal end 116 of the neck 88 by further engaging with the posts 112 on the end plate 98. During this twisting action, the end plate 98 will turn with the RO cartridge 26 and move towards opening the flow path between the RO manifold 44 and the RO cartridge 26. Once all of the check valves 114 are engaged with the posts 112 and the flow paths are nearly engaged, the protrusions 90 on the neck 88 of the RO cartridge 26 contact the end of the cammed slots 106 (see FIG. 13) on the revolving head 94, thus, the RO cartridge 26 will no longer move axially. Once at the end of the slots 106, the protrusions 90 are able to engage with and turn the revolving head 94. In some embodiments, the revolving head 94 has a snap feature that provides tactile feedback to the user, on both extremes of the revolving head's range of motion. Once the revolving head 94 is completely turned and locked, the flow paths are fluidly coupled between the system 20 and the RO cartridge 26.

Additionally, and referring to FIG. 14, in some embodiments, a position sensor 121, which may be a Hall effect sensor, is included that alerts the controller 30 when each of the cartridges 26, 40, 42 is locked into place. One type of Hall Effect sensor is a transducer that varies its output voltage in response to a magnetic field that operates as an analog transducer, directly returning a voltage.

Figure 17:
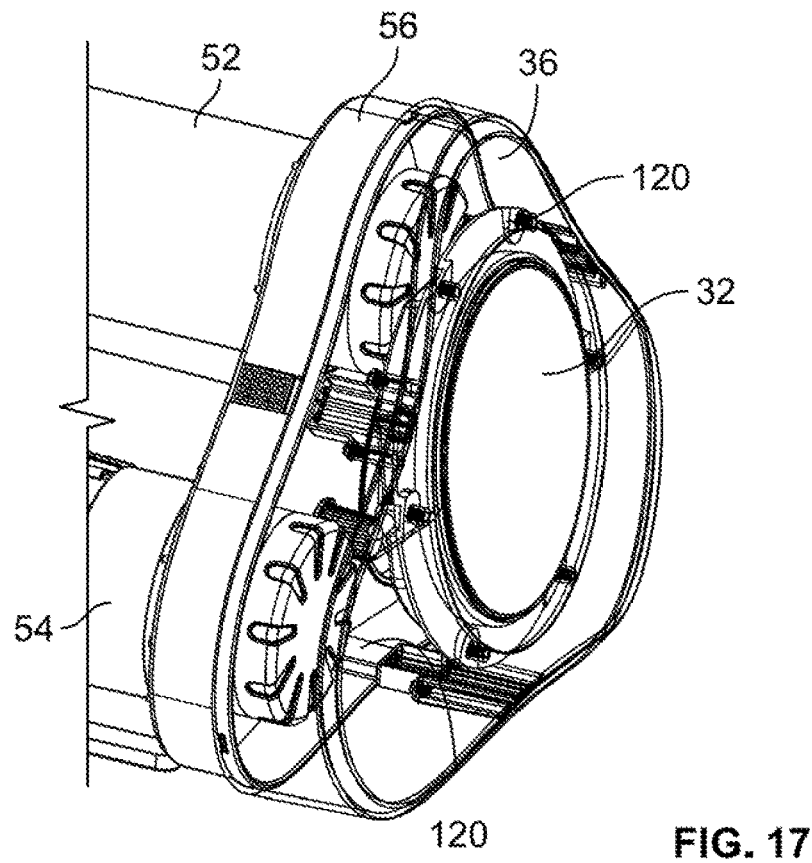
FIG. 17 is an isometric view of the water filtration system of FIG. 2 with a translucent from cover to illustrate magnets disposed within the housing.
Figure 18:
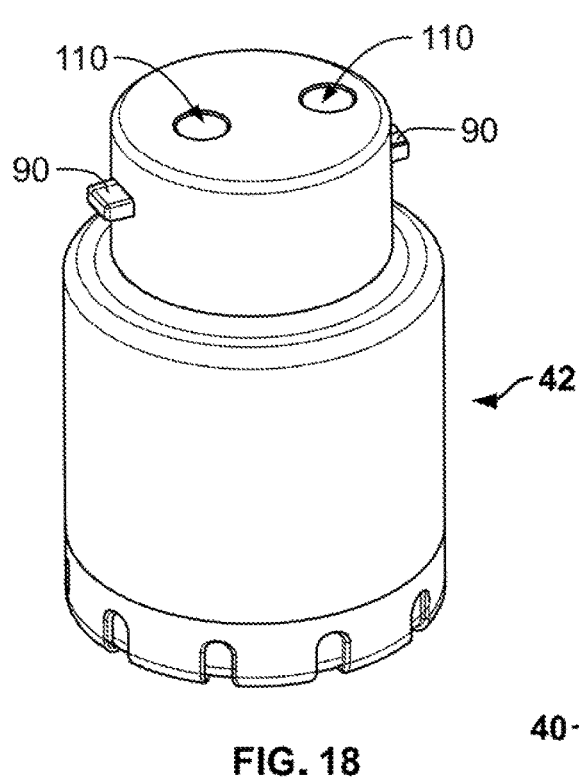
FIG. 18 is an isometric view of a post-filter element that is optionally included in the system of FIG. 2.
Figure 19:
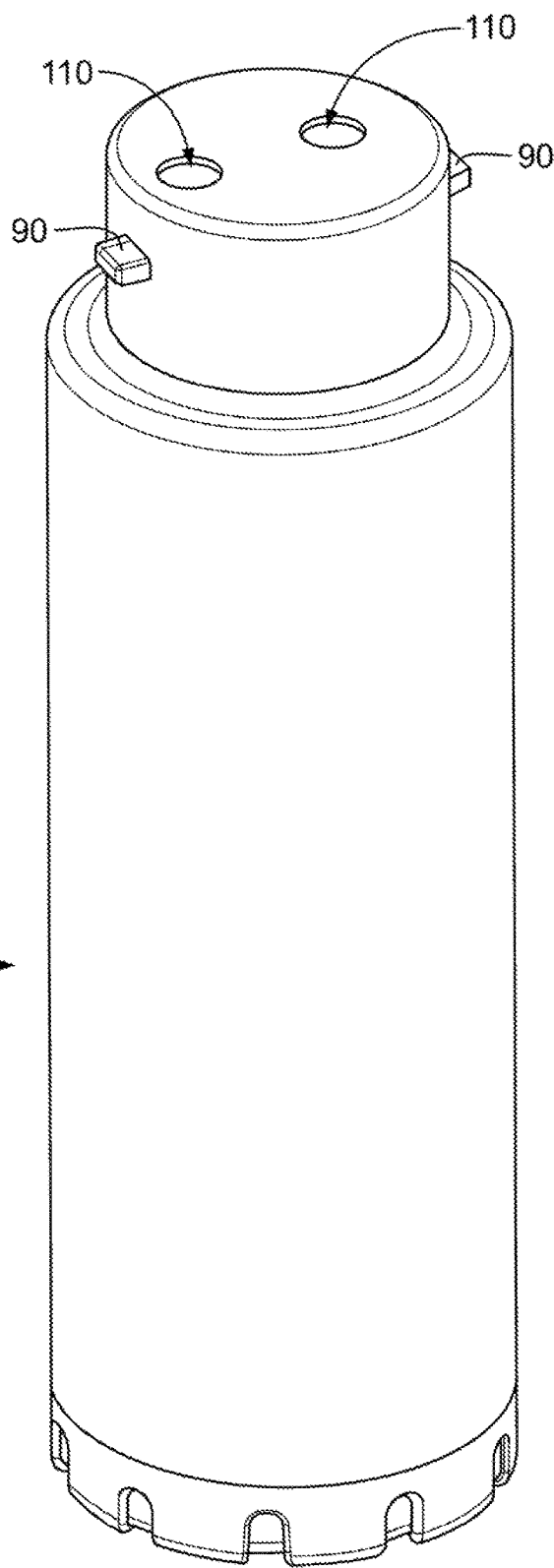
FIG. 19 is an isometric view of a pre-filter element that is optionally included in the system of FIG. 2.
Figure 20:
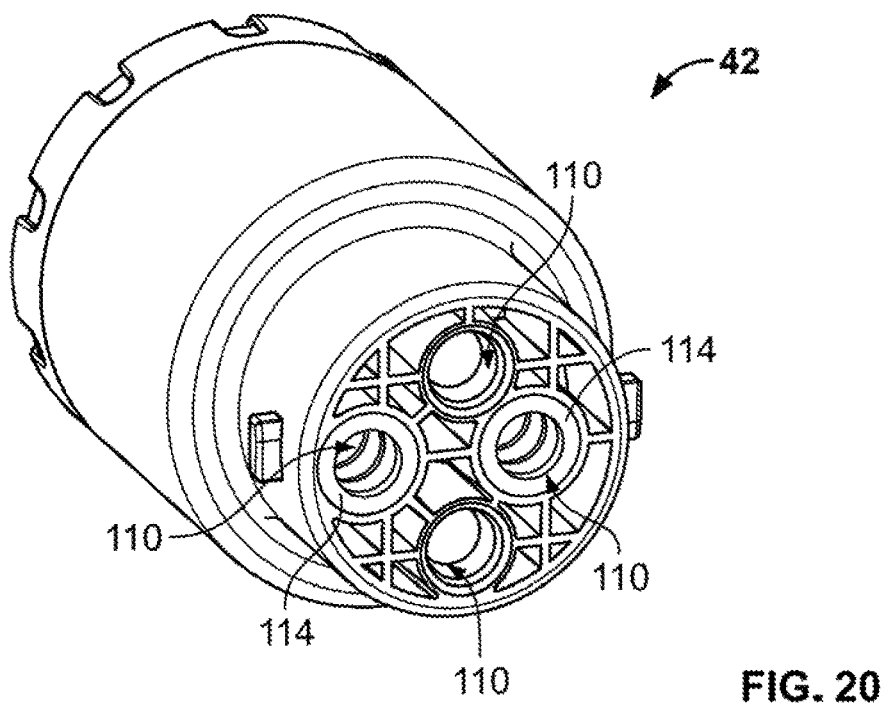
FIG. 20 is a top isometric view of the post-filter element of FIG. 18.
Figure 21:
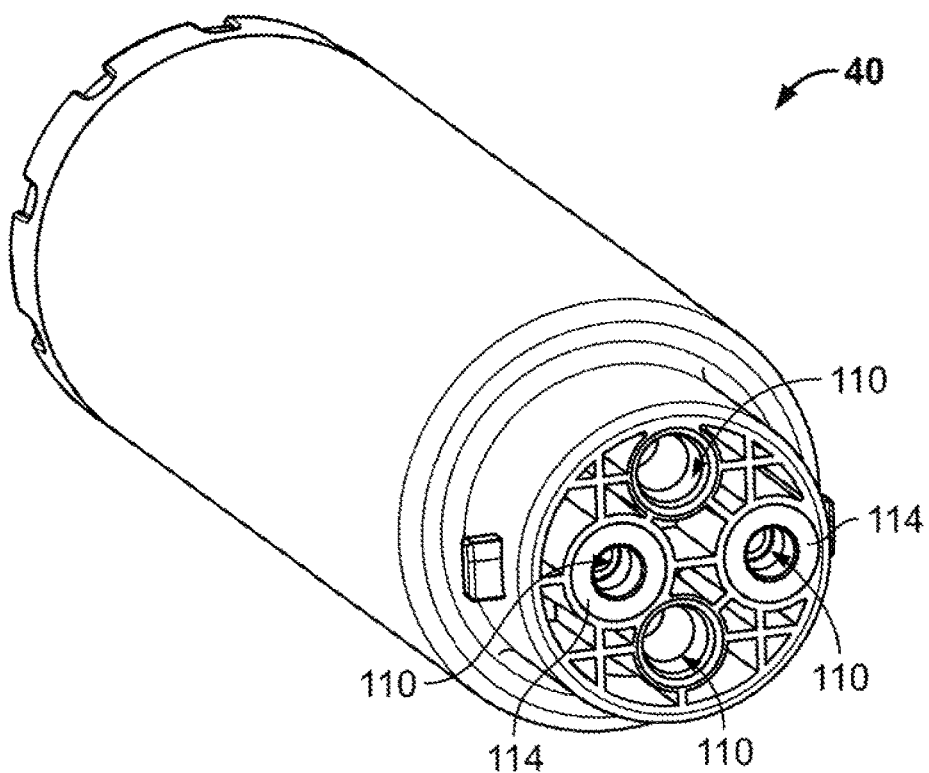
FIG. 21 is a top isometric view of the pre-filter element of FIG. 19.

FIG. 17 depicts a magnetic cover attachment feature of the system. In some embodiments, the front cover 36 of the outer housing 34 of the RO system 20 is connected to the housing 34 via one or more magnets 120. The one or more magnets 120 may be provided along the inner side of the outer housing 34, along an inner or outer side of the front cover 36, or along another component. The magnets 120 are designed to allow for easy removal of the front cover 36 such that a user may achieve easier access into the outer housing 34 to change any of the components therein, including the RO cartridge 26. In one specific embodiment, three magnets 120 are provided to secure the front cover 36 to the housing 34.

FIGS. 18-21 further depict the quick change feature with respect to the pre-filter cartridge 40 and the post-filter cartridge 42. The quick change feature for the cartridges 40, 42 is similar to that as described above with respect to the RO element 26. The quick change feature is a quick connect (lock and key) feature that allows the filters the pre-filter cartridge 40, the post-filter cartridge 42) to be attached and/or unattached to portions of the system 20 through a twisting motion. The cartridges 40, 42 each include check valves 114 that are opened when the filters 40, 42 are attached as a part of the system 20, as discussed above, and close when the cartridges 40, 42 are removed from engagement with the system 20. There can be numerous protrusions 90 on the cartridges 40, 42 that engage slots on the filter heads to lock the cartridges 40, 42 in place.

One or more of the pre-filter cartridge 40, post-filter cartridge 42, and/or RO element 26 may include endcaps that are designed to help secure the filters in the housing 34. Additionally, in one embodiment, the pre-filter cartridge 40 may include a centrally disposed carbon block or Fiberdyne® branded filter surrounded by a pleated filter.

Figure 22:
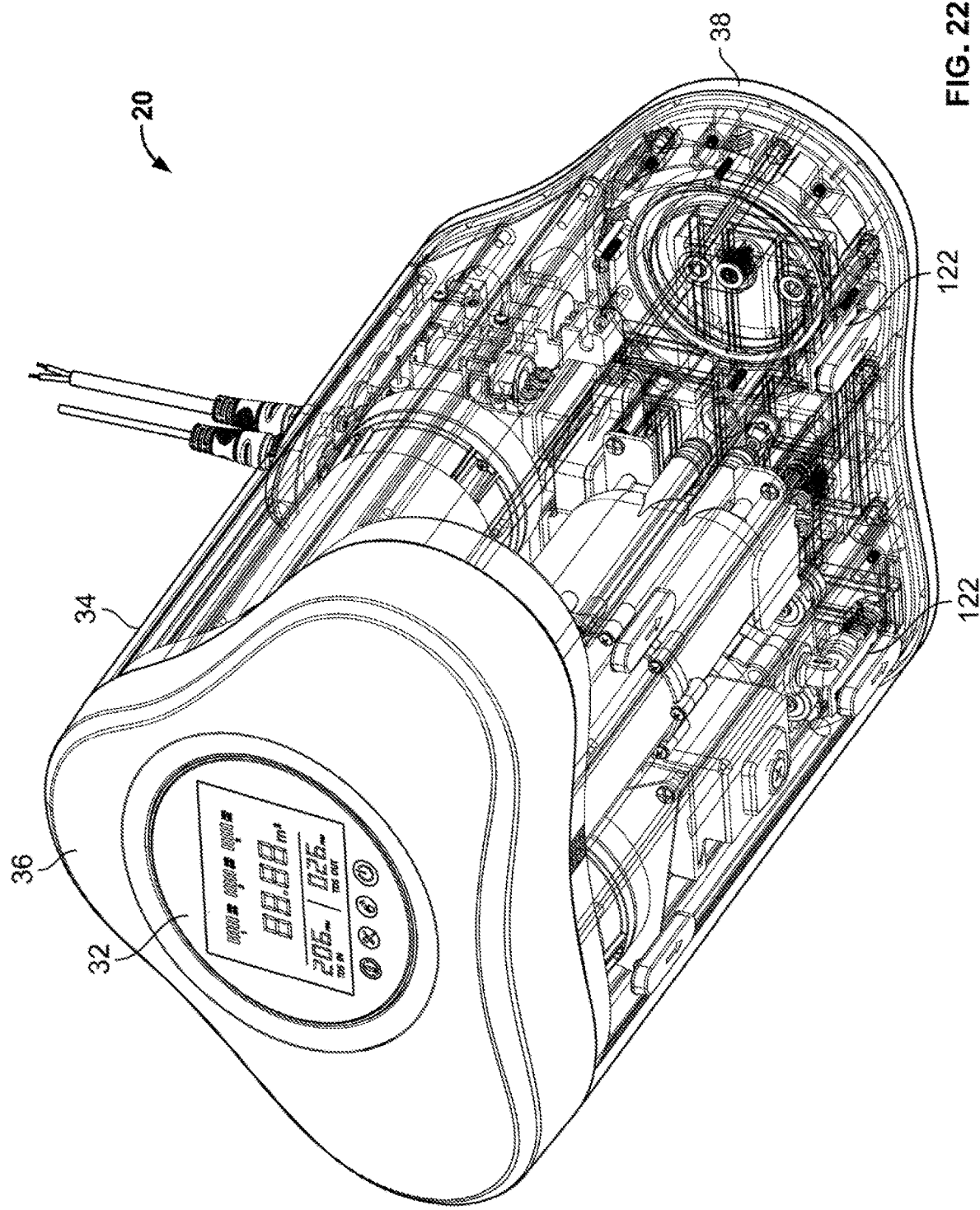
FIG. 22 is a bottom isometric view of the water filtration system of FIG. 2 with a translucent outer cover to illustrate leak detection sensors within the system.

FIG. 22 illustrates another aspect of the present disclosure, which is electronic leak detection. One or more leak sensors 122 are provided inside of the RO system 20 that can provide a signal to the controller 30 to shut down the system 20 if a leak is detected. The benefit of having more than one (at least two) sensor(s) is that two or more sensors can reduce the risk of a false positive due to moisture of non-catastrophic drips. The electronic leak detection sensors 122 in the RO system 20 can send a signal to warn the user and/or shut down the system by using resistive or signal-based sensing means. The leak sensors 122 are designed to signal the controller 30 to shut down the pump 22 and inlet solenoid 48 when water comes in contact with both of the leak sensors 122. In some embodiments, one to four leak sensors 122 are disposed within the enclosure of the system 20. In some embodiments, more than four leak sensors 12 are included.

In some forms, if a fitting or other component leaks within the outer cover 44 of the system 20, the controller 30 may be programmed to determine that such a leak indicates a demand for water and the system 20 will run until that demand is filled. In such an instance, the system 20 would run non-stop if the leak is constant. The leak sensors 122 communicate to the controller 30, if a leak is detected, to shut down the pump 22 and the inlet solenoid 48. As discussed above, two or more of the leak detection sensors 122 may be used instead of one single sensor to reduce false positives. Being able to shut down the pump 22 if a leak is detected may be important, and utilizing two leak sensors 122 can reduce the risk of a false positive due to moisture or non-catastrophic drips. It may be desirable to prohibit the pump 22 from shutting off unless two or more of the leak sensors 122 detect a water leak.

Figure 23:
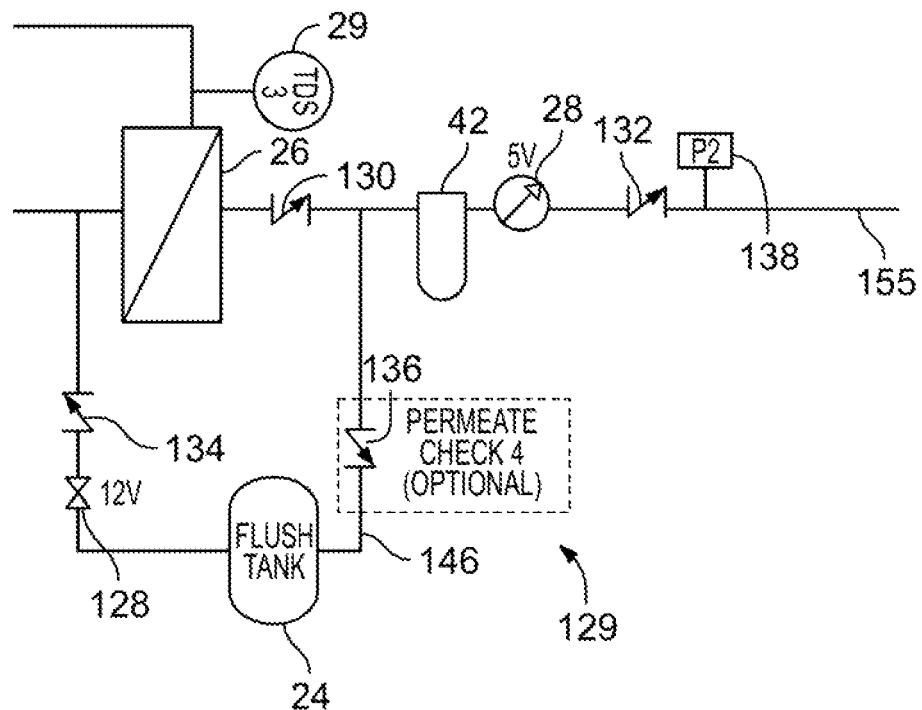
FIG. 23 is a schematic illustration of a portion of FIG. 1 showing a permeate flush portion of the system.

Referring now to FIG. 23, another aspect of this disclosure, the "permeate flush" aspect, will now be discussed. A permeate flush loop 129 is shown in FIG. 23. In typical RO systems, a "permeate flush" operation is a cleaning technique used to reduce the level of salts on the feed side of the membrane during an "off" period or cleaning cycle. This technique helps to increase the life of membranes used in the system by reducing the potential of hardness scaling. It also reduces the amount of salt that passes through the membrane during an "off" or "rest" cycle. The RO system 20 discussed throughout includes a "permeate flush" mode that is designed to re-circulate some of the permeate water that exits the RO cartridge 26 back into the inlet of the RO cartridge 26. The RO system 20 uses a hydro-pneumatic flush tank as the flush tank 24 to store pressurized permeate water, however, alternative flush tanks may be used. In order to control when the flush occurs, a flush solenoid 128 is used to open the flow path between the permeate water and the feed water. Referring back to FIG. 1, the system 20 may have one or more of a first check valve 130, a second check valve 132, a third check valve 134, and/or a fourth check valve 136 within the permeate flush loop 129. The check valves 130, 132, 134, 136 are some of the check valves 114. In some embodiments as discussed below, the permeate flush loop 129 is not included in the system 20.

Still referring to FIG. 23, the third check valve 134 prevents the flow of feed water into the permeate stream. The first check valve 130 and/or the fourth check valve 136 prevent back flow of permeate water through the RO cartridge 26. The fourth check valve 136 also may prevent water stored in the flush tank 24 to mix with the water provided to the user. The second check valve 136 is placed between the flush line and a high pressure switch/sensor 138. This is to allow for flushing during "off" times without reactivating the pump 22 by signaling the high pressure switch 138.

Generally, the method of reverse osmosis permeate flushing results w some of the permeate water from the reverse osmosis element being re-circulated back into the inlet of the RO cartridge 26 for time-based flushing purposes. Flushing preferably occurs if the system 20 has not been used within, e.g., eight hours or seven hours, or six hours, or five hours, or four hours, or some other amount of time. If the system 20 is used within eight hours, for example, then the flush tank 24 may act as a buffer for at least partial Total Dissolved Solid (TDS) creep. The purpose of flushing the RO cartridge 26 with permeate water is to prevent stagnant water and to reduce TDS creep across the RO cartridge of the RO cartridge 26.

Figure 24:
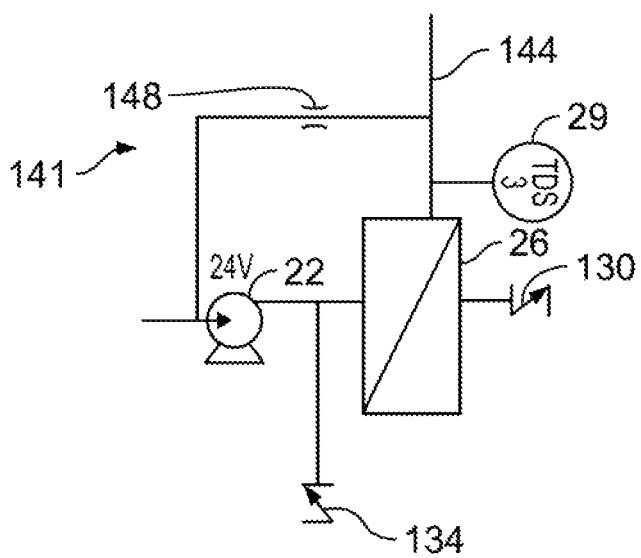
FIG. 24 is a schematic illustration of a portion of FIG. 1 showing a concentrate recirculation portion of the system.

Now referring to FIG. 24, another aspect of the disclosure related to concentrate recirculation will now be discussed. A concentrate recirculation loop 141 is shown in FIG. 24. In a preferred embodiment, the system 20 is operable to recirculate or redirect a controlled amount of water from the concentrate or drain line back to the inlet of the pump 22 where it is mixed with the feed water. The concentrate recirculation loop 141 of the system 20 is shown in FIG. 24. The concentrate re-circulation loop includes the pump 22, one of the TDS meters 29, the RO cartridge 26, a portion of a drain line 144, a flush line 146, and a first flow restrictor 148. As discussed above, in a typical RO system, cross flow velocities are designed to be maintained during filtration in order to prevent the accumulation of particulates on the membrane surface and in the feed spacer. Typically, the flow of concentrate water to the drain line provides enough flow to prevent this build up. However, as RO systems become more efficient and direct less water to the drain, this flow rate must be supplemented. To do this, a controlled amount of water is re-directed from the concentrate or drain line back to the inlet of the pump where it is mixed with the feed water. The output flow rate through the recirculation line is a function of the RO element design and how much water is being directed to the drain (or how efficiently the system is being run).

Referring again to FIG. 1, the drain line 144 extends from the RO cartridge 26 toward a drain 147. The drain line 144 separates at an intersection point such that a second flow restrictor 149 is provided along a first branch 151 and the flush solenoid valve 49 is provided along a second branch 153. The flow restrictor 149 can restrict the flow of water therethrough, while the flush solenoid 49 can be open, closed, or partially open to allow water therethrough. The first branch 151 and the second branch 153 come together to reform the drain line 144, which ultimately leads to the drain 147. A faucet line 155 extends between the RO cartridge 26 and a faucet 160.

Still referring to FIG. 1, the system 20 will now be described in further detail. Water enters the system 20 and may pass through a strainer 161, which may be any strainer known to those of ordinary skill in the art. After passing through the strainer 161, the water passes the low pressure switch 150, through the solenoid valve 48, and past both the TDS meters 29 and one of the sensors 28, which may be a temperature sensor. The water then passes through the pre-filter 40, past another one of the sensors 28, which may be a flow meter, and into the pump 22. The pump 22 pumps the water into the RO element 26, where water is either directed toward the drain 147 or toward the faucet 160. Water directed toward the drain 147 may be recirculated through the recirculation loop 141 and water directed toward the drain may be redirected through the flush loop 129.

Water that is redirected through the recirculation loop 141 exits the RO element 26, passes by one of the TDS meters 29, passes through the first flow restrictor 148, and re-enters the inlet stream at the inlet of the pump 22. Water that does not enter the recirculation loop 141 flows through the drain line 144 and is directed through either the first branch 151 or the second branch 153. Water directed through the first branch 151 flows through the second flow restrictor 149 and water directed through the second branch 153 passes through the solenoid valve 49 if the solenoid valve 49 is in an open configuration. Water that is redirected through the flush loop 129 passes through the first check valve 130, the fourth permeate cheek valve 136, is stored in the flush tank 24 until flushing commences, then passes through the flush solenoid valve 128, the third check valve 134, and re-enters the inlet stream at the inlet of the RO cartridge 26. Water that does not enter the flush loop 129 exits the RO cartridge 26, passes through the first check valve 130, passes through the post-filter 42, past one of the sensors 28, which may be a flow meter, through the second check valve 132, past the high pressure switch 138, and past one of the TDS meters 29 to the faucet 160.

In some embodiments, the system 20 could be re-configured to allow for back-flushing of the RO cartridge 26 at a controlled flow or pressure. Referring to FIGS. 3-4, the system 20 includes the graphical user interface 32 and/or digital display which may output readings from the TDS meter 29 or any of the other components in the system 20. The TDS meter 29 may be located along different portions of the system 20 and supplies the end user with information about the water quality going in and out of the system 20. Further, the system 20 may output, via the digital display, flow and volumetric information to the end user. This data may be used to determine when one or more of the cartridges need to be changed and/or when there is an error in the system operation. Because temperature affects the flow rate of a membrane element, it could be considered useful for either a customer or service technician to have easy access to temperature data. Temperature data could be displayed, collected through a wired device, and/or collected wirelessly.

A first or low pressure switch 150 may be used to detect low pressures or a vacuum at a point in the system before or upstream of the pump 22 and the first solenoid 48. If the pressure is too low, the first pressure switch 150 may provide a reading to the controller 30 indicating that water pressure is low and/or that there is no water source. The second or high pressure switch 138, which may be located downstream of the first pressure switch 150, may indicate that there is a demand for water after the RO cartridge 26. When the high pressure switch 138 obtains a high pressure reading, then the controller 30 may will signal the system to shut down. If the high pressure switch 138 obtains a pressure reading that drops below a specific pressure, the controller 30 may instruct the system to begin filtering water.

Figure 25:
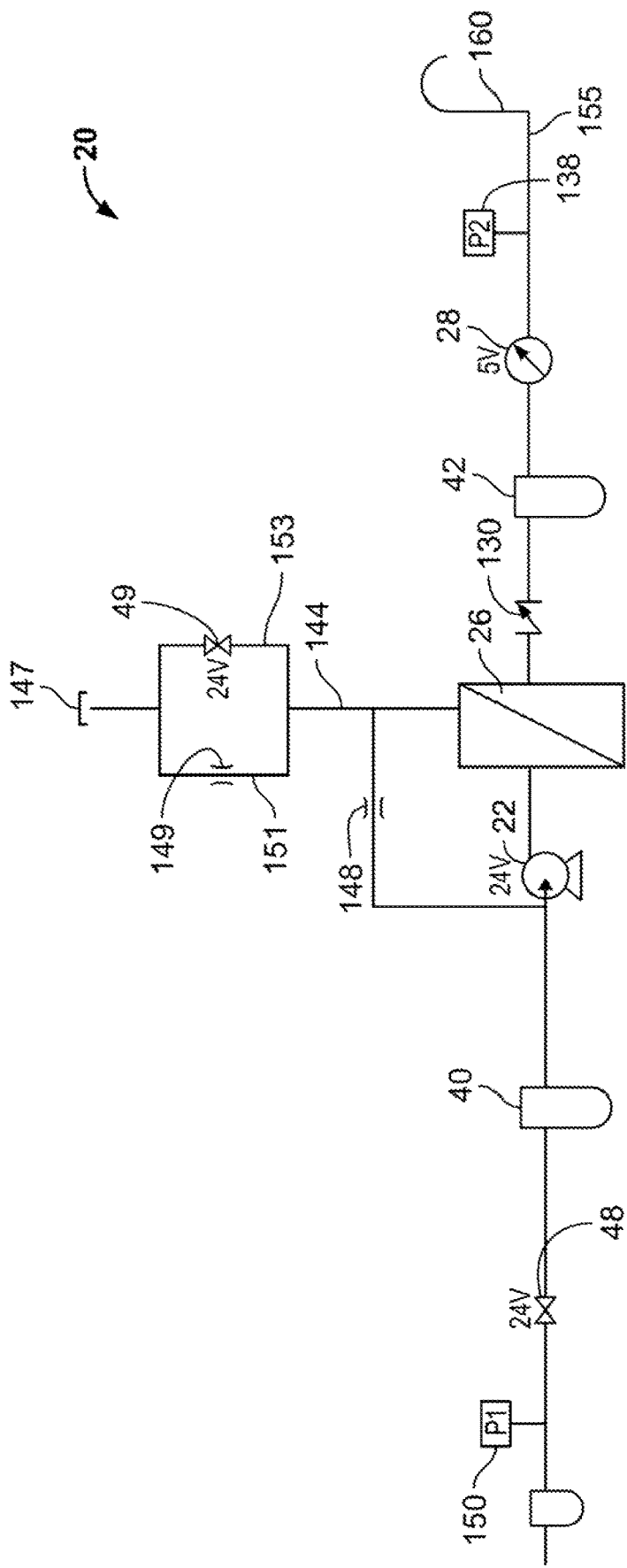
FIG. 25 is a schematic illustration of another embodiment of a water filtration system.

In some embodiments, the system 20 may include fewer components than the systems described above for any number of reasons including cost savings, available space considerations, or for some other reason. For example, and referring to FIG. 25, the system may include one or more of the pump 22, one or more of the flow meters 28, the RO element 26, the pre-filter 40, the post-filter 42, the inlet solenoid valve 48, the first check valve 130, the high pressure switch 138, the drain line 144, and the concentrate recirculation portion including the flow restrictor 148. As a result, one or more of the sensors 28, including one of the temperature sensors and one of the flow meters, the flush tank 24, the third solenoid valve 128, the third check valve 134, the TDS meter 29, and/or the second permeate check valve 132 may be excluded from the system 20. Any of the abovementioned components of the system 20 may be excluded or rearranged within the system 20 to optimize the system, for cost savings, for efficiency, or for some other reason.

Figure 26:
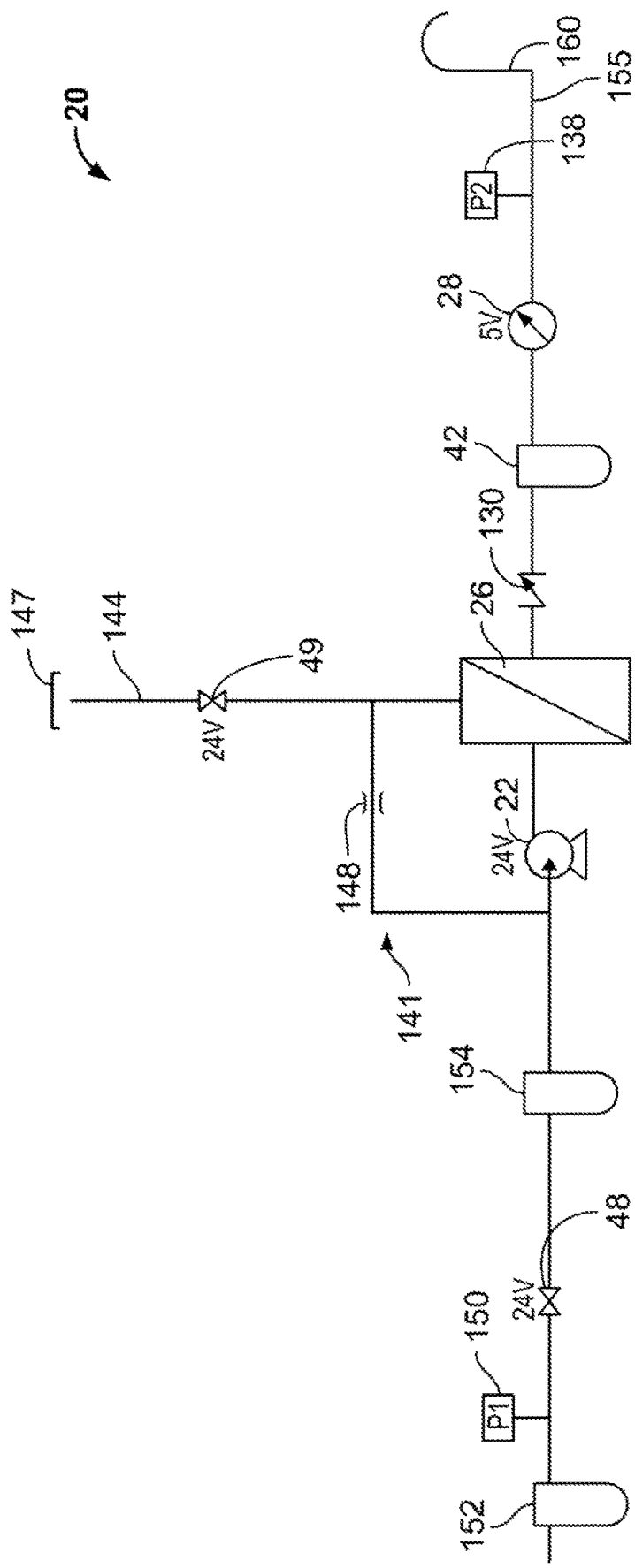
FIG. 26 is a schematic illustration of yet another embodiment of a water filtration system.

Further, referring to FIG. 26, the system 20 may include the pump 22, one of the sensors 28, which may be a flow meter, the RO element 26, the post-filter 42, the inlet solenoid valve 48, the flush solenoid valve 49, the first check valve 130, the high pressure switch 138, the drain line 144, the flow restrictor 148, the low pressure switch 150, a first pre-filter 152, and a second pre-filter 154. As water enters the system 20, it passes through the first pre-filter 152, past the low pressure switch 150, and through the inlet solenoid valve 48 if the inlet solenoid valve 48 is open. If the inlet solenoid valve 48 is closed, water is not permitted to pass into the system. If the inlet solenoid valve 48 is open, water passes through the inlet solenoid valve 48, through the second pre-filter 154, and into the pump 22. The pump 22 pumps the water into the RO element 26.

Water that is in the RO element 26 can be directed either toward the drain line 144 or toward a faucet 150. Water that is directed toward the drain line 144 exits the RO element 26 and is directed either through the flow restrictor 148, and ultimately back to the pump 22, or the water is directed to the drain line 144 through the flush solenoid valve 49. If the flush solenoid valve 49 is open, water can flow through the flush solenoid valve 49 to the drain 147. If the flush solenoid valve 49 is closed, the water is directed through the concentrate recirculation loop by flowing through flow restrictor 148. Water that is directed to the faucet 160 is directed out of the RO element, flows through the first check valve 130, through the post-filter 42, past one of the sensors 28, which may be a flow meter, past the high pressure switch 138, and out of the faucet 160.

Figure 27:
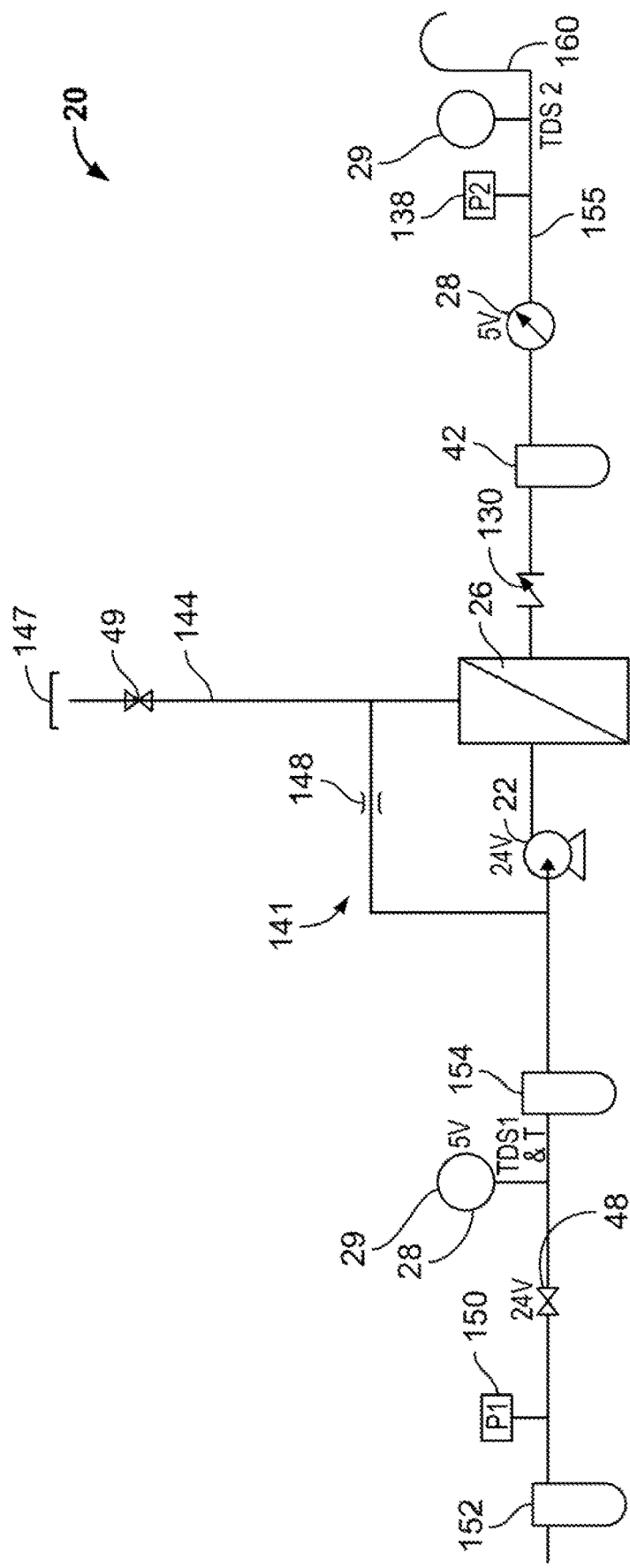
FIG. 27 is a schematic illustration of still another embodiment of a water filtration system.

Still further, referring to FIG. 27, the system 20 may include the pump 22, one or more sensors 28, one or more TDS meters 29, which may be a flow meter, the RO element 26, the post-filter 42, the inlet solenoid valve 48, the flush solenoid valve 49, the first check valve 130, the high pressure switch 138, the drain line 144, the flow restrictor 148, the low pressure switch 150, a first pre-filter 152, and a second pre-filter 154.

In one alternative embodiment, the system could use another type of membrane filter other than a reverse osmosis membrane. In another alternative the system could have two membranes in parallel or series. In another alternative the system could function without a pump. In one alternative the system would have a post-filter that had disinfection capabilities either through UV, MF, or UF technology. The sensors 28 and/or the TDS meters 29 described herein may be the same throughout the system 20, or they may be different.

The invention claimed is:

1. A tankless reverse osmosis water filtration system for residential use, comprising:
   a housing;
   a pre-filter element disposed within the housing, the pre-filter in fluid communication with an inlet of a pump;
   a reverse osmosis element disposed within the housing a coupled with an outlet of the pump;
   a reverse osmosis manifold, wherein the reverse osmosis manifold comprises a reverse osmosis cap with a ring fixedly secured to the reverse osmosis manifold and a head rotational within the ring, the ring including a plurality of engagement slots each corresponding to one of a plurality of engagement protrusions on the reverse osmosis element and the head including a plurality of cammed slots each corresponding to one of the engagement protrusions and engagement slots, and wherein, when the engagement protrusions are slid into the engagement slots and engage the corresponding cammed slot, rotation of the reverse osmosis element in a first direction causes movement of the reverse osmosis element axially towards the reverse osmosis manifold;

a first solenoid valve disposed between a first outlet of the reverse osmosis element and a drain line;

a post-filter element disposed between a second outlet of the reverse osmosis element and a faucet line;

a flush loop in parallel with the reverse osmosis element, wherein the flush loop recycles a portion of fluid from the second outlet of the reverse osmosis element to an inlet of the reverse osmosis element downstream of the pump;

a concentrate recirculation loop comprising at least one total dissolved solids meter, wherein the concentrate recirculation loop recycles a portion of fluid from the drain line to the inlet of the pump; and at least two electronic leak detectors disposed within the housing and connected to a controller, the controller configured to send a signal when at least two of the at least two electronic leak detectors sense a leak.

2. The system of claim 1 further comprising a second solenoid valve located upstream of the first pre-filter element.

3. The system of claim 2 further comprising a second pre-filter element located upstream of the second solenoid valve.

4. The system of claim 3 further comprising a total dissolved solid meter located between the first pre-filter element and the second pre-filter element.

5. The system of claim 2 further comprising a low pressure switch located upstream of the second solenoid valve.

6. The system of claim 1 further comprising a high pressure switch located between the post-filter and the faucet.

7. The system of claim 6 further comprising a flow meter located between the post-filter and the high pressure switch.

8. The system of claim 1 further comprising a flow restrictor located between the first outlet of the reverse osmosis element and the inlet of the pump.

9. The system of claim 1 further comprising a check valve located between the first pre-filter element and the post-filter element.

10. The system of claim 1 further comprising at least one of a temperature sensor or a total dissolved solids meter located upstream of the pre-filter.

11. The system of claim 1 further comprising a total dissolved solids meter located downstream of the post-filter.

12. A tankless reverse osmosis water filtration system for residential use, comprising:

a housing having a removable cover, the housing sized to be mounted under a sink;

a pump in communication with a pre-filter element, a reverse osmosis element having a neck at a first end with a plurality of engagement protrusions extending radially from the neck, and a post-filter element, and the pre-filter element, the post-filter element, and the reverse osmosis element fluidly coupled with a reverse osmosis manifold to form a fluid path through the housing; and at least two electronic leak detectors disposed within the housing and the cover, the cover being releasably attachable to the housing, wherein the reverse osmosis manifold comprises a reverse osmosis cap with a ring fixedly secured to the reverse osmosis manifold and a head rotational within the ring, the ring including a plurality of engagement slots each corresponding to one of the plurality of engagement protrusions and the head including a plurality of cammed slots each having an end surface, wherein each of the cammed slots corresponds to one of the engagement protrusions and engagement slots, wherein, when the engagement protrusions are slid into the engagement slots and engage the corresponding cammed slot, rotation of the reverse osmosis element in a first direction causes movement of the engagement protrusions within the cammed slots and the reverse osmosis element axially towards the reverse osmosis manifold until the engagement protrusions contact the end surfaces of the cammed slots, wherein further rotation of the reverse osmosis element in the first direction when the engagement protrusions contact the end surfaces of the cammed slots causes rotation of the head, and wherein the at least two electronic leak detectors are connected to a controller configured to send a signal to the pump when at least two of the at least two electronic leak detectors are activated.

13. The system of claim 12 further comprising a first solenoid valve located along a drain line of a first outlet of the reverse osmosis element, and a second solenoid valve located upstream of the pre-filter element.

14. The system of claim 13 further comprising a low pressure switch located upstream of the second solenoid valve, and a high pressure switch located downstream of the post-filter element.

15. The system of claim 12 further comprising a concentrate recirculation loop fluidly coupled with an outlet of the reverse osmosis element and the inlet of the pump.

16. The system of claim 15 further comprising a flow restrictor located between the outlet of the reverse osmosis element and the inlet of the pump along the concentration recirculation loop.

17. The system of claim 12 further comprising a sensor associated with one of the reverse osmosis element or the reverse osmosis manifold to alert a user when the reverse osmosis element has been installed properly.

18. The system of claim 17 further wherein the reverse osmosis element includes a snap feature that provides tactile feedback to the user when the reverse osmosis element being is installed properly.

19. The system of claim 12, wherein the cam slots each have an end wall and further rotation of the reverse osmosis element in the first direction after the engagement protrusions contact the end walls results in rotation of the revolving ring in the first direction.

* * * * *